US011755157B2

(12) United States Patent
Poupyrev et al.

(10) Patent No.: US 11,755,157 B2
(45) Date of Patent: Sep. 12, 2023

(54) PRE-FABRICATED SENSOR ASSEMBLY FOR INTERACTIVE OBJECTS

(71) Applicant: Google LLC, Mountain View, CA (US)

(72) Inventors: Ivan Poupyrev, Sunnyvale, CA (US); Kishore Sundara-Rajan, Redwood City, CA (US); Tong Wu, Mountain View, CA (US); Mustafa Emre Karagozler, London (GB); Brendon Allen Beardsley, Lake Stevens, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/772,271

(22) PCT Filed: Aug. 22, 2019

(86) PCT No.: PCT/US2019/047717
§ 371 (c)(1),
(2) Date: Jun. 12, 2020

(87) PCT Pub. No.: WO2020/231452
PCT Pub. Date: Nov. 19, 2020

(65) Prior Publication Data
US 2022/0350444 A1  Nov. 3, 2022

Related U.S. Application Data

(60) Provisional application No. 62/846,463, filed on May 10, 2019.

(51) Int. Cl.
*G06F 3/044* (2006.01)
*D03D 15/533* (2021.01)
*D03D 1/00* (2006.01)

(52) U.S. Cl.
CPC ......... *G06F 3/0446* (2019.05); *D03D 1/0088* (2013.01); *D03D 15/533* (2021.01);
(Continued)

(58) Field of Classification Search
CPC ......... G06F 3/0446; G06F 2203/04102; G06F 2203/04103; G06F 2203/04107;
(Continued)

(56) References Cited

U.S. PATENT DOCUMENTS 8,035,039 B2   10/2011  Cha et al.
8,373,672 B2 *  2/2013  Wallace ............... H03K 17/975
                                                200/600
(Continued)

FOREIGN PATENT DOCUMENTS

WO    WO 2007/137486    12/2007

OTHER PUBLICATIONS

International Search Report and Written Opinion for PCT/US2019/047717, dated Feb. 20, 2020, 6 pages.

*Primary Examiner* — Ibrahim A Khan
(74) *Attorney, Agent, or Firm* — Dority & Manning, P.A.

(57) ABSTRACT

A pre-fabricated sensor assembly for an interactive object including an object substrate is provided. The pre-fabricated sensor assembly includes a touch sensor comprising a plurality of flexible sensing elements, a first electronics module comprising sensing circuitry in electrical communication with the plurality of flexible sensing elements, a communication interface comprising a first end portion coupled to the first electronics module and comprising a second end portion, a receptacle coupled to the second end portion of the communication interface, and one or more flexible retaining layers that define a housing for a first portion of the pre-fabricated sensor assembly. The first portion of the (Continued)

pre-fabricated sensor assembly can include at least a portion of each of the plurality of flexible sensing elements.

20 Claims, 21 Drawing Sheets

(52) U.S. Cl.
CPC ........... *G06F 2203/04102* (2013.01); *G06F 2203/04103* (2013.01); *G06F 2203/04107* (2013.01)

(58) Field of Classification Search
CPC .... G06F 3/044; D03D 1/0088; D03D 15/533; D10B 2401/16; A41D 1/002
See application file for complete search history.

(56) References Cited

U.S. PATENT DOCUMENTS

| | | | | |
|---|---|---|---|---|
| 10,908,732 | B1* | 2/2021 | Sundara-Rajan | G06F 3/0445 |
| 10,990,185 | B2* | 4/2021 | Dierk | G06F 3/011 |
| 11,342,271 | B2* | 5/2022 | Maxey | H05K 1/189 |
| 2002/0076948 | A1* | 6/2002 | Farrell | H05K 3/0058 |
| | | | | 2/243.1 |
| 2005/0054941 | A1* | 3/2005 | Ting | A61B 5/296 |
| | | | | 600/534 |
| 2006/0281382 | A1 | 12/2006 | Karayianni et al. | |
| 2009/0303602 | A1 | 12/2009 | Bright et al. | |
| 2010/0283749 | A1 | 11/2010 | Walkington | |
| 2011/0197742 | A1* | 8/2011 | Liotta | H04R 1/1033 |
| | | | | 84/730 |
| 2013/0068602 | A1 | 3/2013 | Reynolds et al. | |
| 2013/0147727 | A1* | 6/2013 | Lee | H10K 59/40 |
| | | | | 345/173 |
| 2014/0048310 | A1 | 2/2014 | Montevirgen et al. | |
| 2014/0070957 | A1* | 3/2014 | Longinotti-Buitoni | |
| | | | | A61B 5/02055 |
| | | | | 340/870.01 |
| 2014/0295063 | A1 | 10/2014 | Petcavich et al. | |
| 2014/0318699 | A1* | 10/2014 | Longinotti-Buitoni | |
| | | | | H05K 1/038 |
| | | | | 156/247 |
| 2016/0038083 | A1* | 2/2016 | Ding | A61B 5/1135 |
| | | | | 600/388 |
| 2016/0048235 | A1* | 2/2016 | Poupyrev | D03D 1/0088 |
| | | | | 345/174 |
| 2016/0058076 | A1* | 3/2016 | Reho | A61B 5/4561 |
| | | | | 600/595 |
| 2016/0128632 | A1* | 5/2016 | Wiebe | A61B 5/0015 |
| | | | | 340/870.07 |
| 2016/0241286 | A1* | 8/2016 | Sullivan | H04B 1/3888 |
| 2016/0282988 | A1* | 9/2016 | Poupyrev | G06F 3/04162 |
| 2017/0196513 | A1* | 7/2017 | Longinotti-Buitoni | |
| | | | | A61B 5/7405 |
| 2017/0300147 | A1* | 10/2017 | Tomita | G01L 1/205 |
| 2017/0325337 | A1* | 11/2017 | Karagozler | H05K 1/147 |
| 2017/0325518 | A1* | 11/2017 | Poupyrev | D03D 1/0088 |
| 2018/0203531 | A1* | 7/2018 | Tsai | G06F 3/04164 |
| 2018/0255842 | A1* | 9/2018 | Karagozler | G06F 3/03547 |
| 2018/0260052 | A1 | 9/2018 | Karagozler | |
| 2018/0310659 | A1* | 11/2018 | Poupyrev | A61B 5/291 |
| 2018/0338544 | A1* | 11/2018 | Huang | H05K 1/147 |
| 2019/0132948 | A1* | 5/2019 | Longinotti-Buitoni | |
| | | | | A61B 5/743 |
| 2021/0064161 | A1* | 3/2021 | Sundara-Rajan | G06F 3/044 |

* cited by examiner

PRE-FABRICATED SENSOR ASSEMBLY FOR INTERACTIVE OBJECTS

This application is based upon and claims the right of priority under 35 U.S.C. § 371 to International Application No. PCT/US2019/047717 filed on Aug. 22, 2019, which is based upon and claims the right of priority to U.S. Provisional Application No. 62/846,463, filed on May 10, 2019. Applicant claims priority to and the benefit of each of such applications and incorporates all such applications by reference herein in their entirety for all purposes.

FIELD

The present disclosure relates generally to touch sensors for interactive objects.

BACKGROUND

An interactive object includes sensing lines such as conductive threads or conductive lines incorporated into the interactive object to form a sensor such as a capacitive touch sensor that is configured to detect touch input. The interactive object can process the touch input to generate touch data that is useable to initiate functionality locally at the interactive object or at various remote devices that are wirelessly coupled to the interactive object. Interactive objects may include conductive lines for other purposes, such as for strain sensors using conductive threads and for visual interfaces using line optics.

An interactive object may be formed by forming a grid or array of conductive thread woven into an interactive textile, for example. Each conductive thread can include a conductive wire (e.g., a copper wire) that is twisted, braided, or wrapped with one or more flexible threads (e.g., polyester or cotton threads). It may be difficult, however, for traditional sensor designs with such conductive lines to be implemented within objects.

SUMMARY

Aspects and advantages of embodiments of the present disclosure will be set forth in part in the following description, or may be learned from the description, or may be learned through practice of the embodiments.

One example aspect of the present disclosure is directed to a method of manufacturing an interactive object. The method can include receiving a manufactured object including an object substrate, wherein the manufactured object is in a form suitable for its primary purpose and includes a receiving feature. The method can include providing a pre-fabricated sensor assembly including one or more flexible retaining layers, a capacitive touch sensor, a first electronics module, and a communication interface having a first end portion coupled to the first electronics module and a second end portion coupled to a receptacle configured to removably connect a second electronics module to the pre-fabricated sensor assembly. The capacitive touch sensor can include a plurality of flexible sensing lines elongated in a first direction and coupled to the first electronics module. The first electronics module can be powered by a power source of the second electronics module when the second electronics module is connected to the pre-fabricated sensor assembly. The method can include attaching the pre-fabricated sensor assembly to the object substrate after receiving the manufactured object.

One example aspect of the present disclosure is directed to a pre-fabricated sensor assembly for an interactive object including an object substrate. The pre-fabricated sensor assembly can include a capacitive touch sensor including a plurality of flexible sensing elements, a first electronics module including sensing circuitry in electrical communication with the plurality of flexible sensing elements, a communication interface including a first end portion coupled to the first electronics module and including a second end portion, a receptacle coupled to the second end portion of the communication interface, and one or more flexible retaining layers that define a housing for a first portion of the pre-fabricated sensor assembly. The first portion of the pre-fabricated sensor assembly can include at least a portion of each of the plurality of flexible sensing elements. The receptacle can be configured to removably connect a second electronics module to the pre-fabricated sensor assembly.

One example aspect of the present disclosure is directed to a method of manufacturing an interactive object. The method can include providing a pre-fabricated sensor assembly including one or more flexible retaining layers, a capacitive touch sensor, a first electronics module, and a communication interface having a first end portion coupled to the first electronics module and a second end portion coupled to a receptacle configured to removably connect a second electronics module to the pre-fabricated sensor assembly. The capacitive touch sensor can include a plurality of flexible sensing lines elongated in a first direction and coupled to the first electronics module. The method can include providing an at least partially fabricated object including an object substrate, and attaching the pre-fabricated sensor assembly to the object substrate after providing the at least partially fabricated object.

One example aspect of the present disclosure is directed to an interactive object including an object substrate and a pre-fabricated sensor assembly at least partially coupled to the object substrate. The pre-fabricated sensor assembly can include a plurality of flexible sensing lines, sensing circuitry in electrical communication with the plurality of flexible sensing lines, a communication interface including a first end portion coupled to the sensing circuitry and including a second end portion, a receptacle coupled to the second end portion of the communication interface and configured to removably connect a second electronics module to the pre-fabricated sensor assembly, and one or more flexible retaining layers that define a housing for a first portion of the pre-fabricated sensor assembly. The first portion of the pre-fabricated sensor assembly can include at least a portion of each of the plurality of flexible sensing lines. The one or more flexible retaining layers can be physically coupled to the object substrate.

One example aspect of the present disclosure is directed to a pre-fabricated sensor assembly for an interactive object including an object substrate. The pre-fabricated sensor assembly includes a capacitive touch sensor including a plurality of flexible sensing lines elongated in at least a first direction. Each of the plurality of flexible sensing lines can include a first section that extends in a first direction and a second section that extends in a second direction. The first direction and the second direction can be substantially orthogonal and a width of the first section of each flexible sensing line can be less than a width of the second section of each flexible sensing line. The pre-fabricated sensor assembly can include a first electronics module including sensing circuitry in electrical communication with the plurality of flexible sensing lines, a communication interface including a first end portion coupled to the first electronics module and including a second end portion, and a receptacle coupled to the second end portion of the communication interface. The receptacle can include one or more electrical contacts for electrically coupling to a second electronics module. The receptacle can be configured to removably connect the second electronics module to the pre-fabricated sensor assembly.

One example aspect of the present disclosure is directed to an interactive object that includes an object substrate and a capacitive touch sensor including a plurality of conductive threads elongated in at least a first direction. At least one of the plurality of conductive threads can include a first section integrated with one or more non-conductive threads to form a textile-based substrate. At least one of the plurality of conductive threads can include a second section that is physically coupled to the object substrate of the interactive object. The first electronics module can include sensing circuitry in electrical communication with the plurality of conductive threads. The pre-fabricated sensor assembly can include a communication interface including a first end portion coupled to the first electronics module and including a second end portion. The pre-fabricated sensor assembly can include a receptacle coupled to the second end portion of the communication interface. The receptacle can be configured to removably connect a second electronics module to the interactive object.

One example aspect of the present disclosure is directed to an interactive object that includes a first capacitive touch sensor including a first subset of a plurality of flexible sensing lines. Each flexible sensing line of the first subset can include a first section that is elongated in a first direction and a second section that is elongated in a second direction. The interactive object can include a second capacitive touch sensor that includes a second subset of the plurality of flexible sensing lines. Each flexible sensing line of the second subset can include a first section that is elongated in the first direction and can include a second section. The interactive object can include one or more shield layers that overlie the first section of each flexible sensing line of the first subset of the plurality of flexible sensing lines and one or more sensing circuits physically coupled to the first subset of the plurality of flexible sensing lines and the second subset of the plurality of flexible sensing lines. The second section of each flexible sensing line of the first subset of the plurality of flexible sensing lines can form a touch-sensitive area of the first capacitive touch sensor. The second section of each flexible sensing of the second subset of the plurality of flexible sensing lines can form a touch-sensitive area of the second capacitive touch sensor.

One example aspect of the present disclosure is directed to a pre-fabricated sensor assembly for an interactive object including an object substrate. The pre-fabricated sensor assembly includes a sensor, an electronics module comprising sensing circuitry in electrical communication with the sensor, and one or more flexible retaining layers that define a housing for a first portion of the pre-fabricated sensor assembly.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for implementing and utilizing touch sensors such as capacitive touch sensors.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
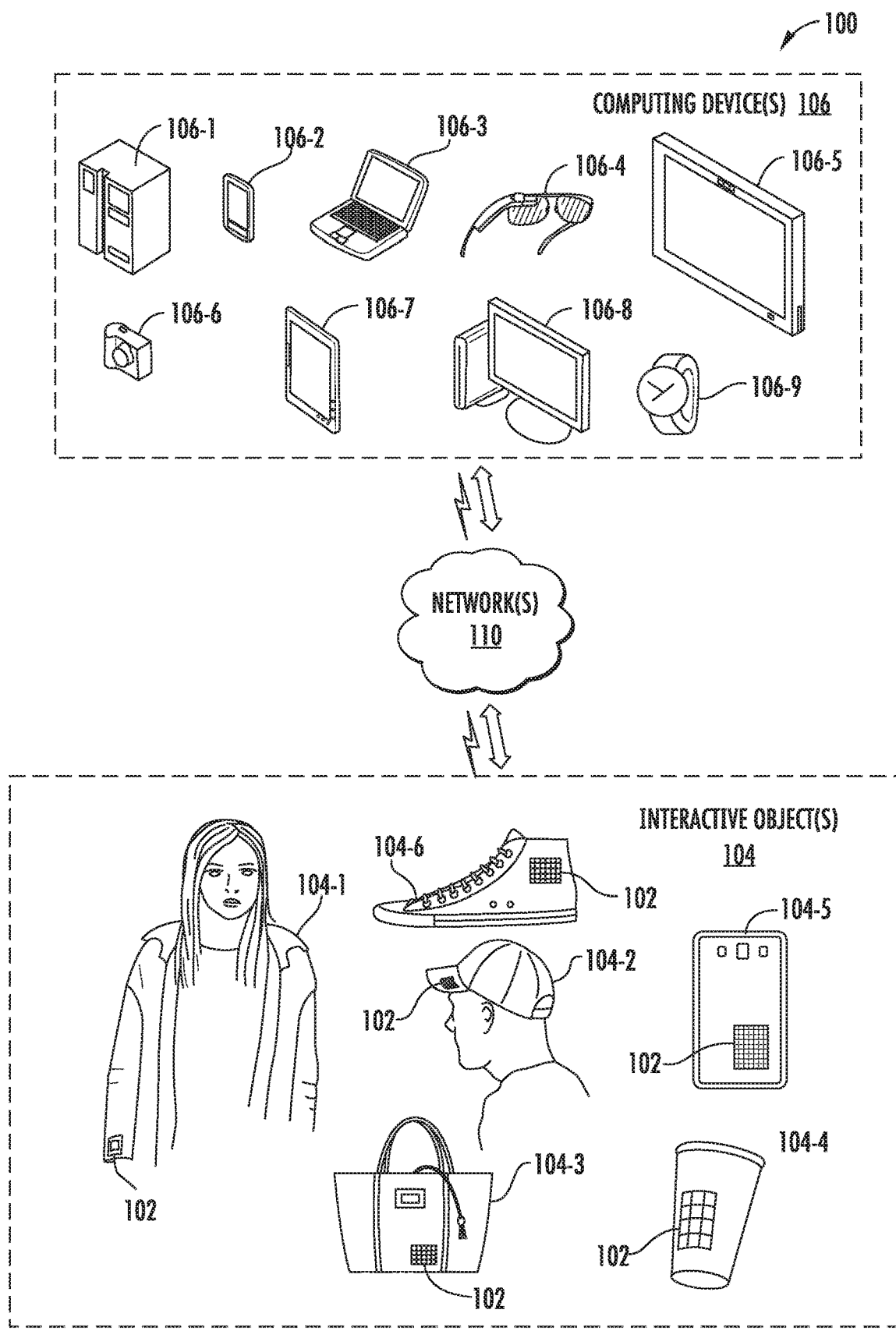
FIG. 1 depicts a block diagram of an example computing environment in which a pre-fabricated sensor assembly in accordance with example embodiments of the present disclosure may be implemented.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to a pre-fabricated sensor assembly and related manufacturing processes that can be applied to create interactive objects from existing object substrates that have been at least partially fabricated or otherwise formed prior to application of the pre-fabricated sensor assembly. A pre-fabricated sensor assembly can include a touch sensor such as a resistive or capacitive touch sensor and sensing circuitry formed in a housing that enables tight integration with an interactive object, while also being suitable for application to the interactive object after the interactive object has been at least partially assembled. In this manner, the pre-fabricated sensor assembly can enable physical incorporation of the touch sensor within an interactive object, while also permitting traditional manufacturing processes to be used to form at least a portion of the interactive object.

According to some example embodiments, a pre-fabricated sensor assembly can include a touch sensor having a plurality of sensing elements that are coupled to sensing circuitry of a first electronics module. One or more communication interfaces such as a communication cable can be coupled to the electronics module to facilitate communication with other electronic components that are local to the pre-fabricated sensor assembly and/or that are remote from the assembly, such as a smartphone or other computing device. A receptacle can be coupled to at least one of the communication cables for removably connecting a second electronics module to the pre-fabricated sensor assembly.

One or more flexible retaining layers can be used to define a housing for at least the touch sensor and optionally other components such as the first electronics module. In some examples, the one more retaining layers can also be used to attach the pre-fabricated sensor assembly to a substrate of an object. For example, the one more retaining layers can be heat-pressed, sewn, glued, bonded or otherwise attached to the substrate of an existing object so as to form interactive object therefrom. The one or more retaining layers may be one or more encapsulating layers form from a polyurethane or other suitably flexible material. In this manner, traditional manufacturing processes may be utilized to form at least a portion of the object prior to integrating a capacitive touch sensor. By way of example, an interactive garment including a pre-fabricated sensor assembly in accordance with example embodiments can be manufactured with minimal disruption to traditional manufacturing processes that are utilized to form garments and the like. A garment can be at least partially manufactured using traditional textile manufacturing processes, followed by attaching the pre-fabricated sensor assembly to form an interactive garment.

A pre-fabricated sensor assembly for interactive objects in accordance with example embodiments may be contrasted with previous approaches for forming interactive objects. For example, many existing techniques seek to integrate sensing elements into a substrate such as a textile fabric prior to forming an object. For instance, some existing techniques weave conductive threads into a fabric to form a capacitive touch sensor. In these approaches, a fabric with conductive threads undergoes any manufacturing processes used to form an object such as cutting, sewing, gluing, etc. Many traditional manufacturing processes, such as traditional textile manufacturing processes, however, may not be able to process, or may not be as easily able to process, a substrate such as a textile fabric that has conductive sensing lines integrated within the fabric. Accordingly, such techniques may require modifications to traditional textile machinery and processes in order to be able to accommodate conductive threads. As such, in many cases it may be not be desirable to form sensing lines within a textile substrate that forms a garment or other interactive object, etc.

In accordance with example embodiments of the present disclosure, a pre-fabricated sensor assembly can include a touch sensor that includes a plurality of sensing elements that are adapted for integration within an object after at least a portion of the object has been formed. In this manner, traditional manufacturing processes may be utilized to form at least a portion of the object prior to integration of the capacitive touch sensor.

For example, an interactive object can be manufactured by receiving a manufactured object that includes an object substrate. The manufactured object can be in a form suitable for its primary purpose such as a garment that is suitable for wear, a backpack or luggage that is suitable for carrying items, etc. The manufactured object may include sub-components of objects, such as a strap or other object that is intended to be applied to other materials to form a final product. Nevertheless, the strap is suitable for its primary purpose of attachment and providing a carrying mechanism. The manufactured object can include a receiving feature. The manufacturing process can include providing a pre-fabricated sensor assembly including one or more flexible retaining layers, a capacitive touch sensor, a first electronics module, and a communication interface having a first end portion coupled to the first electronics module and a second end portion coupled to a receptacle configured to removably connect a second electronics module to the pre-fabricated sensor assembly. The capacitive touch sensor can include a plurality of flexible sensing lines elongated in a first direction and coupled to the first electronics module. The first electronics module can be powered by a power source of the second electronics module when the second electronics module is connected to the pre-fabricated sensor assembly. The manufacturing process can include attaching the pre-fabricated sensor assembly to the object substrate after receiving the manufactured object.

By way of example, an interactive object can include a "soft" object such as a garment, garment accessory, or garment container at least partially formed from a flexible substrate. The flexible substrate may be formed of a soft material such as leather, natural fibers, synthetic fibers, or networks of such fibers. The flexible substrate may include a textile such as a woven or non-woven fabric, or other materials such as flexible plastics, films, etc. Materials may be formed by weaving, knitting, crocheting, knotting, pressing threads together or consolidating fibers or filaments together in a nonwoven manner. Interactive objects may also include "hard" objects such as may be made from nonflexible or semi-flexible materials such as plastic, metal, aluminum, and so on. By utilizing flexible sensing lines with a flexible retaining layer structure, a pre-fabricated sensor assembly in accordance with embodiments of the present disclosure may be incorporated or otherwise applied to at least partially formed soft objects and/or hard objects.

As a specific example, consider a garment such as a shirt or jacket that can be manufactured from a textile-based substrate. In such a case, a woven or non-woven fabric can be processed using traditional textile manufacturing techniques that may include sewing, gluing, and other fastening techniques to form the garment. The pre-fabricated sensor assembly can be attached to the garment after at least a portion of the garment has been formed using these traditional manufacturing processes.

To apply pre-fabricated sensor assembly in accordance with example embodiments, one or more portions of a garment may be left accessible, such as by leaving an opening in a cuff of a jacket or shirt. One or more seams that are used to form the cuff portion of the jacket may be left open for example. The open cuff may comprise a receiving feature of the interactive object. The pre-fabricated sensor assembly can be inserted into the opening or otherwise attached to the existing textile substrate that forms the interactive garment. The pre-fabricated sensor assembly can be sewn, glued, heat pressed, or attached to the jacket in another suitable manner. After attaching the pre-fabricated sensor assembly, the one or more seams can be sewn or otherwise closed to complete manufacturing of the cuff for the interactive object. In this manner, minimal disruption to the manufacturing process for making the jacket itself may occur. In some instances, additional portions of the manufacturing process can be performed after attaching the pre-fabricated capacitive sensor assembly.

As another example, the pre-fabricated sensor assembly may be attached to the inner portion of a garment or other object without leaving an opening for inserting the assembly. For example, the pre-fabricated sensor assembly can be affixed to the inside surface of a textile using a heat press application, sewing application, or other mechanism to attach the pre-fabricated sensor assembly to the partially formed object.

In accordance with some embodiments, a pre-fabricated sensor assembly may include one or more capacitive touch sensors and one or more electronics modules that include sensing circuitry electrically coupled to the capacitive touch sensor. The one or more capacitive touch sensors can each include a plurality of flexible and conductive sensing lines. The sensing lines can be formed of various flexible materials and in various formations to provide a capacitive touch sensor that is capable of flexible integration within various types of interactive objects.

Traditionally, the use of flexible sensing lines as a post fabrication application has been problematic because of the ability of the sensing lines to move relative to one another. Movement of sensing lines relative to one another may affect the ability of sensing circuitry and other components to properly detect an input. In some cases, such movement may even result in shorting of the sensing lines to one another.

By applying one or more flexible retaining layers in accordance with example embodiments, a flexible sensor assembly can be provided in a post fabrication application while maintaining a predefined arrangement of the sensor elements. The flexible sensing lines can be positioned in a predefined arrangement, including a size and spacing relative to one another and/or other components of the pre-fabricated assembly prior to incorporation within an object. One or more retaining layers can be utilized to secure the plurality of sensing lines in the predetermined arrangement. The retaining layer(s) can provide structural stability to maintain the plurality of sensing lines in the desired arrangement. Because of their flexibility, the one or more retaining layers can also permit the assembly to flex as the interactive object moves and flexes. In some examples, the flexible retaining layer(s) can provide physical separation of the flexible sensing lines from the object substrate.

In accordance with some embodiments, a plurality of sensing elements can be formed from a multilayered flexible film to facilitate a flexible sensing line for application to existing objects. For example, the multilayered film may include one or more flexible base layers such as a flexible textile, plastic, or other flexible material. One or more metal layers may extend over the flexible base layer(s). Optionally, one or more passivation layers can extend over the one or more flexible base layers and the one or more metal layer(s) to promote adhesion between the metal layer(s) and the base layer(s). In accordance with some examples, a multilayered sheet including one or more flexible base layers, one or more metal layers, and optionally one or more passivation layers can be formed and then cut, etched, or otherwise divided into individual sensing lines. Each sensing line can include a line of the one or more metal layers formed over a line of the one or more flexible base layers. Optionally, a sensing line can include a line of one or more passivation layers overlying the one or more flexible base layers.

According to some embodiments, one or more adhesive layers may be applied to the plurality of sensing lines to help maintain the sensing lines in a predefined arrangement and/or to couple the sensing lines to other layers. The one or more adhesive layers may be applied to a first surface of each sensing line or a portion of each sensing line in some examples. The adhesive layer may be a common adhesive layer that extends across a surface of each of the sensing lines.

In some examples, one or more shield layers can be applied over at least a portion of one or more of the sensing lines to selectively define a touch-sensitive area for the capacitive touch sensor. By way of example, the plurality of sensing lines for a capacitive touch sensor may extend in a first direction and a second direction that is different than the first direction. For instance, the plurality of sensing lines may extend in a longitudinal direction and a lateral direction that is substantially orthogonal to the longitudinal direction.

The longitudinal portion of each conductive sensing line can be covered with one or more shield layers to selectively define a touch-sensitive area for the capacitive touch sensor at the portion of the sensing lines that extends in the lateral direction. Alternatively, the lateral portion of each conductive sensing line can be covered with the one or more shield layers to selectively define a touch-sensitive area at the portion of the sensing line that extends in the longitudinal direction. The one or more adhesive layers can be applied over a upper surface of the one or more sensing lines and the one or more shield layers can be applied over an upper surface of the one or more adhesive layers. Other examples of selective formation of a touch-sensitive area utilizing one or more shield layers can be used. In some examples, a single layer may provide electrical shielding as well as adhesive properties.

In accordance with some embodiments, a plurality of sensing lines may each include a first portion that extends in a first direction with a spacing therebetween in a second direction. The second direction can be substantially orthogonal to the first direction. The plurality of sensing lines can also extend in the second direction with a spacing therebetween in the first direction. The first portion of each sensing line can connect to sensing circuitry while the second portion of each sensing line can be used to form a touch-sensitive area for the capacitive touch sensor. The spacing in the first direction can be less than the spacing in the second direction to enable a compact arrangement for attaching the conductive lines to the sensing circuitry. At the same time, the larger spacing in the second direction can facilitate a more robust detection of touch inputs in some examples. By spacing the sensing lines appropriately, a more efficient, accurate, and/or precise detection of touch inputs may be achieved.

In accordance with some examples, a plurality of conductive threads can form the plurality of sensing lines for a capacitive touch sensor of a pre-fabricated sensor assembly. At least a portion of each conductive thread can be connected to a flexible substrate, such as by weaving, embroidering, gluing, or otherwise attaching the conductive threads to the flexible substrate. In some examples, the conductive threads can be woven with a plurality of non-conductive threads to form the flexible substrate.

In some examples, each conductive thread may include a first loose end that is not directly attached to the flexible substrate. Each conductive thread can include a second loose end that is opposite to the first loose end of the conductive thread and that is also not directly attached to the flexible substrate. In between the loose ends, each conductive thread may include an attached portion that extends along and in attachment with the flexible substrate. The first loose end of each conductive thread can be attached to the internal electronics module of the pre-fabricated sensor assembly. The second loose end of each conductive thread can be movable relative to the flexible substrate. In some examples, the second loose end of each conductive thread can extend beyond an outer perimeter of the flexible substrate. In some instances, the extent of each conductive line that extends beyond the outer perimeter of the flexible substrate may be utilized as the touch-sensitive area for a capacitive touch sensor.

In some implementations, each conductive thread can include a longitudinal portion that is attached to the flexible substrate and a lateral portion that is loose from the flexible substrate and that optionally extends beyond the outer perimeter of the flexible substrate. The lateral portion of each conductive thread may extend in a substantially orthogonal direction to the longitudinal portion. The lateral portion of each conductive thread may form the touch-sensitive area of the capacitive touch sensor. The touch-sensitive area formed by the lateral portion of the sensing lines can be configured to receive touch inputs such as swipe gestures provided in the longitudinal direction. Other gestures may be detected, such as colds, swipes, etc.

In accordance with some example embodiments, a conductive thread can include a first portion that is attached to the flexible substrate of the pre-fabricated sensor assembly and a second portion that is attached to a different substrate. By way of example, a pre-fabricated sensor assembly may be affixed to a textile substrate to form an interactive garment. The first portion of each conductive thread can be attached to a flexible substrate such as a first textile fabric within the pre-fabricated sensor assembly. The second portion of each conductive thread can be attached to the core substrate of the interactive garment such as the textile substrate from which the interactive garment itself is formed. Various techniques may be utilized to attach the second portion of each conductive thread to the interactive garment substrate. For instance, the second portion of each conductive thread can be attached to the interactive garment using an embroidery technique which may be particularly suitable to application of the conductive thread to an object that has already been fabricated. Other techniques such as gluing, taping, bonding and the like may be used.

In some implementations, one or more shield layers can be utilized to form a first capacitive touch sensor and a second capacitive touch sensor from a plurality of flexible sensing lines. A first capacitive touch sensor can include a first subset of the plurality of flexible sensing lines and a second capacitive touch sensor can include a second subset of the plurality of flexible sensing lines. Each flexible sensing line of the first subset can include a first portion that is elongated in a first direction and a second portion that is elongated and a second direction. Each flexible sensing line of the second subset can include a first portion that is elongated in the first direction and can also include a second portion. One or more shield layers can be formed over the first portion of each flexible sensing light of the first subset. One or more sensing circuits can be physically coupled to the first subset and the second subset of the plurality of flexible sensing lines. In this manner, the second portion of each flexible sensing line of the first subset can form a touch-sensitive area for the first capacitive touch sensor. Additionally, the second portion of each flexible sensing line of the second subset can form a touch-sensitive area for the second capacitive touch sensor. In some examples, the one or more shield layers can overlie the first portion of the flexible sensing line of the second subset of the plurality of flexible something lines. The second portion of each flexible sensing line of the second subset can be elongated and the second direction or the first direction.

Although much of the disclosure is described with respect to capacitive touch sensors, it will be appreciated that any type of sensor may be included in a pre-fabricated sensory assembly as described. For example, resistive touch sensors can be formed in a similar manner to capacitive touch sensors as described. Other types of sensors such as inertial measurement units, strain gauges, ultrasonic sensors, radar-based touch interfaces, image-based sensors, infrared sensors, etc. can be used.

The pre-fabricated sensor assembly can include one or more flexible retaining layers that define a housing for the plurality of sensing lines that form the capacitive touch sensor. The housing can additionally hold other components of the pre-fabricated sensor assembly, such as the internal electronics module. By including the plurality of sensing lines within a housing created by the one or more flexible retaining layers, the plurality of sensing lines for the capacitive touch sensor can be provided in a predefined layout. Moreover, by utilizing flexible layers, the capacitive touch sensor can remain flexible to enable subsequent integration within a variety of interactive objects. Furthermore, the pre-fabricated sensor assembly may be integrated within flexible objects such as an interactive garment in a manner that enables the capacitive touch sensor to remain flexible with the interactive garment. In some examples, the flexible retaining layers can form a water-tight housing. In some examples, the flexible retaining layers can form a hermetically-sealed housing.

According to some example implementations, the interactive object can include an internal electronics module that is integrated within an interactive object. The plurality of sensing elements can be directly attached to the internal electronics module or can be attached to the internal electronics module via one or more connector components. The internal electronics module can provide power and/or control signals to the plurality of sensing lines. The internal electronics module may not include an on-board power source in some embodiments. Instead, a removable electronics module removably coupled via a receptacle of the pre-fabricated sensor assembly can supply power to the internal electronics module.

In some examples, the internal electronics module can include sensing circuitry for the plurality of sensing lines. The internal electronics module can include a first subset of electronic components, such as one or more drivers configured to provide control signals and/or power to the plurality of sensing lines. The internal electronics module in some examples includes a controller that is configured to generate control signals for the for the plurality of sensing lines and to detect changes in capacitance based on objects approaching or coming in contact with the plurality of sensing lines. In some examples, the internal electronics module includes a flexible printed circuit board (PCB). The printed circuit board can include a set of contact pads and/or one or more ports for attaching to one or more communication cables. In some examples, the printed circuit board includes a microprocessor. A portion of the PCB (e.g., including the microprocessor) can be overmolded with a polymer composition.

In some embodiments, a removable electronics module that includes a second subset of electronic components (e.g., a microprocessor, power source, or network interface) can be removably coupled to the interactive object via a communication interface. The communication interface enables communication between the internal electronics module and the removable electronics module when the removable electronics module is coupled to the interactive object. In example embodiments, the removable electronics module can be removably mounted to a rigid member on the interactive object such as a receptacle. A receptacle can include a connecting device for physically and electrically coupling to the removable electronics module. The internal electronics module can be in communication with the receptacle. The internal electronics module can be configured to communicate with the removable electronics module when connected to the receptacle. A controller of the removable electronics module can receive information and send commands to the internal electronics module. A communication interface is configured to enable communication between the internal electronics module and the controller when the receptacle is coupled to the removable electronics module.

For example, the communication interface may include a network interface integral with the removable electronics module. The removable electronics module can also include a rechargeable power source. The removable electronics module can be removable from the interactive object for charging the power source. Once the power source is charged, the removable electronics module can then be placed back into the interactive object and electrically coupled to the connector.

According to some embodiments, a touch sensor formed from one or more sets of sensing elements such as conductive threads or lines formed from one or more conductive films can be coupled to the internal electronics module that is integrated into the interactive object. The set(s) of sensing elements can be directly attached to the internal electronics module or can be attached to the internal electronics module via one or more connector components.

The internal electronics module can include electronic components, such as sensing circuitry configured to detect touch-input to the conductive lines. The sensing circuitry in some examples includes a controller that is configured to detect a touch-input when user pressure is applied to the conductive threads, for example. The controller can also detect a touch input when an object comes in contact with or approaches a sensing line. The controller can be configured to communicate the touch-input data to a computing device. In some examples, the controller includes a flexible printed circuit board (PCB). The printed circuit board can include a set of electrical contacts such as contact pads for attaching to the sensing lines.

Touch inputs provided via a resistive or capacitive touch sensor as described may include various applications and capabilities. By way of example, a touch sensor may be used as a button to detect a simple touch input at a location of the touch sensor. In some examples, a one-dimensional array of sensing lines may be used to implement a touch sensor that can detect a button-type input. A one-dimensional array of sensing lines may also be used to detect a one-dimensional swipe input (e.g., movement in a single direction corresponding to the spacing between threads). In some examples, a two-dimensional array of sensing lines may be used to implement a touch sensor that can detect trackpad inputs, including a specific location of a touch within a grid of conductive threads. Additionally, a two-dimensional array of sensing lines may be used to detect various gesture inputs, authentication inputs, predefined keystrokes, movements, user-specific natural behaviors and the like. One or more machine-learned models may be used to detect user inputs based on training the machine-learned models using training data. Additionally, the touch sensor may be configured to detect analog and pseudo-force inputs from a capacitive change caused by a finger distance.

According to some aspects, the pre-fabricated sensor assembly can be responsive to inputs received via an external computing device (e.g., smartphone, tablet, laptop, etc.). The external computing device can be communicatively coupled to the interactive object using one or more wireless and/or wired interfaces. A gesture manager can be implemented on the computing device to store mappings between gestures and functionalities of the computing device. A functionality mapped to a gesture can be initiated in response to detecting the gesture at the capacitive touch sensor. The interactive object can be responsive to gestures detected by the internal electronics module, removable electronics module, remote computing device, or any combination of the above.

Embodiments of the disclosed technology provide a number of technical effects and benefits, particularly in the areas of computing technology, capacitive touch sensors, and the integration of capacitive touch sensors including related electronics with interactive objects such as garments. Additionally, one or more aspects of the disclosed technology may address issues that may arise when seeking to provide a practical system and method for incorporating input devices such as capacitive touch sensors into existing objects such as garments and the like. In accordance with example embodiments of the disclosed technology, a pre-fabricated sensor assembly can uniquely provide a flexible architecture that can be utilized subsequent to processing at least a portion of the base substrate of an object. In this manner, sensing lines are not necessarily incorporated directly within the object substrate, but instead can be flexibly applied to the object substrate after at least some processing of the substrate. The unique combination of a set of flexible sensing lines that are housed within one or more flexible retaining layers enables a capacitive touch sensor to be tightly integrated within an object, without requiring the sensing lines of the capacitive touch sensor to be integrated with the substrate of the object. Moreover, the flexible retaining layer(s) enable a post-processing attachment of the capacitive touch sensor to thereby create interactive objects from existing structures. Further, the flexible retaining layers can maintain the plurality of sensing lines in a predefined arrangement or layout. This can enable flexible sensing lines to be used while also maintaining the sensing lines in a known and defined arrangement to provide adequate sensing capabilities.

In some examples, a set of conductive lines may include a multilayered film including a flexible base layer, one or more metal layers, and optionally one or more passivation layers. For example, an electromagnetic field shielding fabric can be used. These fabrics may be referred to as EMI fabrics. The metal layer(s) include at least one of a copper layer, a silver layer, or a gold layer. These conductive lines may be formed within a housing defined by one or more flexible retaining layer. In some examples, the plurality of conductive lines may be formed on a common flexible substrate which in some instances may include an adhesive layer. A multilayered structure may enable a flexible metal line to be provided that is suitable for integration within interactive object such as garments, garment accessories, garment containers, and the like.

In some examples, a set of conductive lines may include a set of conductive threads. The set of conductive threads may be attached to a flexible substrate, such as by weaving at least a portion of each of the conductive threads with a plurality of non-conductive threads to form a flexible textile base substrate. The set of conductive threads including the flexible substrate can be provided within a housing created by one or more retaining layers to maintain the set of conductive threads in a predefined arrangement. In some examples, the set of conductive threads can be selectively attached to the flexible substrate such that at least a portion of each conductive thread is loose from the flexible substrate. This can enable unique configurations and arrangements of the capacitive touch sensor including selectively defined touch-sensitive areas where touch inputs are to be received.

These unique arrangements, including but not limited to flexible sensing lines and flexible retaining layers, provide a practical device that can be incorporated within existing manufacturing technologies and other processes. Such approaches may overcome issues related to the high cost and disruptive nature of incorporating sensing lines within the substrate of existing structures. For instance, existing textile and other manufacturing processes may be utilized with the application of a pre-fabricated sensor assembly in accordance with example embodiments.

With reference now to the figures, example aspects of the present disclosure will be discussed in greater detail.

FIG. 1 is an illustration of an example environment 100 in which an interactive object with multiple electronics modules can be implemented. Environment 100 includes a touch sensor 102 (e.g., capacitive or resistive touch sensor), or other sensor. Touch sensor 102 is shown as being integrated within various interactive objects 104. Touch sensor 102 may include one or more sensing elements such as conductive threads or other sensing lines that are configured to detect a touch input. In some examples, a capacitive touch sensor can be formed from an interactive textile which is a textile that is configured to sense multi-touch-input. As described herein, a textile corresponds to any type of flexible woven material consisting of a network of natural or artificial fibers, often referred to as thread or yarn. Textiles may be formed by weaving, knitting, crocheting, knotting, pressing threads together or consolidating fibers or filaments together in a nonwoven manner. A capacitive touch sensor can be formed from any suitable conductive material and in other manners, such as by using flexible conductive lines including metal lines, filaments, etc. attached to a nonwoven substrate.

In environment 100, interactive objects 104 include "flexible" objects, such as a shirt 104-1, a hat 104-2, a handbag 104-3 and a shoe 104-6. It is to be noted, however, that touch sensor 102 may be integrated within any type of flexible object made from fabric or a similar flexible material, such as garments or articles of clothing, garment accessories, garment containers, blankets, shower curtains, towels, sheets, bed spreads, or fabric casings of furniture, to name just a few. Examples of garment accessories may include sweat-wicking elastic bands to be worn around the head, wrist, or bicep. Other examples of garment accessories may be found in various wrist, arm, shoulder, knee, leg, and hip braces or compression sleeves. Headwear is another example of a garment accessory, e.g. sun visors, caps, and thermal balaclavas. Examples of garment containers may include waist or hip pouches, backpacks, handbags, satchels, hanging garment bags, and totes. Garment containers may be worn or carried by a user, as in the case of a backpack, or may hold their own weight, as in rolling luggage. Touch sensor 102 may be integrated within flexible objects 104 in a variety of different ways, including weaving, sewing, gluing, and so forth.

In this example, objects 104 further include "hard" objects, such as a plastic cup 104-4 and a hard smart phone casing 104-5. It is to be noted, however, that hard objects 104 may include any type of "hard" or "rigid" object made from non-flexible or semi-flexible materials, such as plastic, metal, aluminum, and so on. For example, hard objects 104 may also include plastic chairs, water bottles, plastic balls, or car parts, to name just a few. In another example, hard objects 104 may also include garment accessories such as chest plates, helmets, goggles, shin guards, and elbow guards. Alternatively, the hard or semi-flexible garment accessory may be embodied by a shoe, cleat, boot, or sandal. Touch sensor 102 may be integrated within hard objects 104 using a variety of different manufacturing processes. In one or more implementations, injection molding is used to integrate touch sensors into hard objects 104.

Touch sensor 102 enables a user to control an object 104 with which the touch sensor 102 is integrated, or to control a variety of other computing devices 106 via a network 110. Computing devices 106 are illustrated with various non-limiting example devices: server 106-1, smart phone 106-2, laptop 106-3, computing spectacles 106-4, television 106-5, camera 106-6, tablet 106-7, desktop 106-8, and smart watch 106-9, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers). Computing device 106 may be a local computing device, such as a computing device that can be accessed over a bluetooth connection, near-field communication connection, or other local-network connection. Computing device 106 may be a remote computing device, such as a computing device of a cloud computing system.

Network 110 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Touch sensor 102 can interact with computing devices 106 by transmitting touch data or other sensor data through network 110. Additionally or alternatively, touch sensor 102 may transmit gesture data, movement data, or other data derived from sensor data generated by the touch sensor 102. Computing device 106 can use the touch data to control computing device 106 or applications at computing device 106. As an example, consider that touch sensor 102 integrated at shirt 104-1 may be configured to control the user's smart phone 106-2 in the user's pocket, television 106-5 in the user's home, smart watch 106-9 on the user's wrist, or various other appliances in the user's house, such as thermostats, lights, music, and so forth. For example, the user may be able to swipe up or down on touch sensor 102 integrated within the user's shirt 104-1 to cause the volume on television 106-5 to go up or down, to cause the temperature controlled by a thermostat in the user's house to increase or decrease, or to turn on and off lights in the user's house. Note that any type of touch, tap, swipe, hold, or stroke gesture may be recognized by touch sensor 102.

Figure 2:
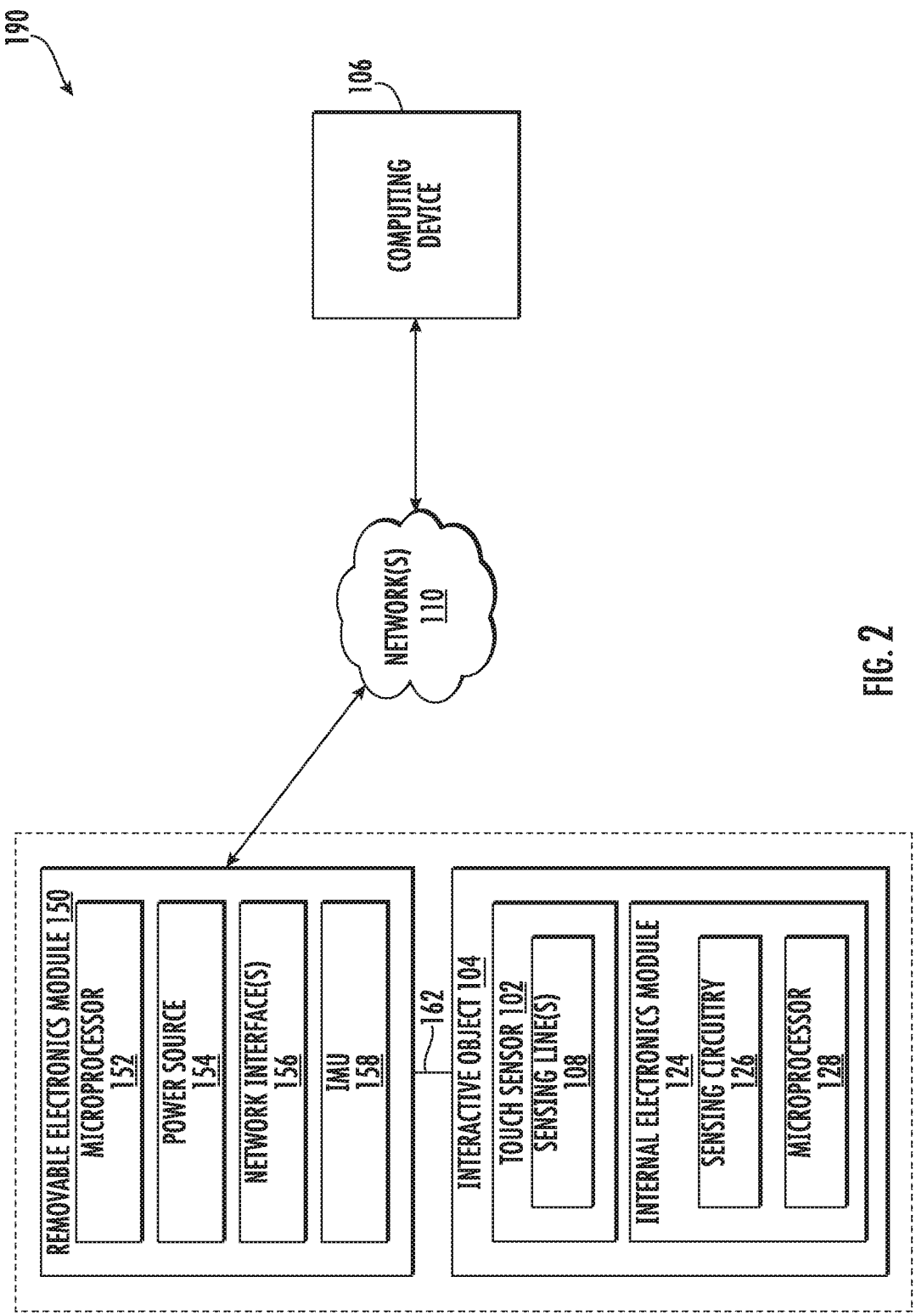
FIG. 2 depicts a block diagram of an example computing environment that includes an interactive object in accordance with example embodiments of the present disclosure.

In more detail, consider FIG. 2 which illustrates an example system 190 that includes an interactive object 104, a removable electronics module 150, and a computing device 106. In system 190, touch sensor 102 is integrated in an object 104, which may be implemented as a flexible object (e.g., shirt 104-1, hat 104-2, or handbag 104-3) or a hard object (e.g., plastic cup 104-4 or smart phone casing 104-5).

Touch sensor 102 is configured to sense touch-input from a user when one or more fingers of the user's hand touch or approach touch sensor 102. Touch sensor 102 may be configured as a capacitive touch sensor or resistive touch sensor to sense single-touch, multi-touch, and/or full-hand touch-input from a user. To enable the detection of touch-input, touch sensor 102 includes sensing lines 108, which can be formed as a grid, array, or parallel pattern so as to detect touch input. In some implementations, the sensing lines 108 do not alter the flexibility of touch sensor 102, which enables touch sensor 102 to be easily integrated within interactive objects 104.

Interactive object 104 includes an internal electronics module 124 that is embedded within interactive object 104 and is directly coupled to sensing lines 108. Internal electronics module 124 can be communicatively coupled to a removable electronics module 150 via a communication interface 162. Internal electronics module 124 contains a first subset of electronic circuits or components for the interactive object 104, and removable electronics module 150 contains a second, different, subset of electronic circuits or components for the interactive object 104. As described herein, the internal electronics module 124 may be physically and permanently embedded within interactive object 104, whereas the removable electronics module 150 may be removably coupled to interactive object 104.

In system 190, the electronic components contained within the internal electronics module 124 includes sensing circuitry 126 that is coupled to sensing lines 108 that form the touch sensor 102. In some examples, the internal electronics module includes a flexible printed circuit board (PCB). The printed circuit board can include a set of contact pads for attaching to the conductive lines. In some examples, the printed circuit board includes a microprocessor. For example, wires from conductive threads may be connected to sensing circuitry 126 using flexible PCB, creping, gluing with conductive glue, soldering, and so forth. In one embodiment, the sensing circuitry 126 can be configured to detect a user-inputted touch-input on the conductive threads that is pre-programmed to indicate a certain request. In one embodiment, when the conductive threads form a grid or other pattern, sensing circuitry 126 can be configured to also detect the location of the touch-input on sensing line 108, as well as motion of the touch-input. For example, when an object, such as a user's finger, touches sensing line 108, the position of the touch can be determined by sensing circuitry 126 by detecting a change in capacitance on the grid or array of sensing line 108. The touch-input may then be used to generate touch data usable to control a computing device 106. For example, the touch-input can be used to determine various gestures, such as single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the textile with a user's entire hand, covering textile with the user's entire hand, pressing the textile with the user's entire hand, palm touches, and rolling, twisting, or rotating the user's hand while touching the textile).

Internal electronics module 124 can include various types of electronics, such as sensing circuitry 126, sensors (e.g., capacitive touch sensors woven into the garment, microphones, or accelerometers), output devices (e.g., LEDs, speakers, or micro-displays), electrical circuitry, and so forth. Removable electronics module 150 can include various electronics that are configured to connect and/or interface with the electronics of internal electronics module 124. Generally, the electronics contained within removable electronics module 150 are different than those contained within internal electronics module 124, and may include electronics such as microprocessor 152, power source 154 (e.g., a battery), network interface 156 (e.g., Bluetooth or WiFi), sensors (e.g., accelerometers, heart rate monitors, pedometers, IMUS), output devices (e.g., speakers, LEDs), and so forth.

In some examples, removable electronics module 150 is implemented as a strap or tag that contains the various electronics. The strap or tag, for example, can be formed from a material such as rubber, nylon, plastic, metal, or any other type of fabric. Notably, however, removable electronics module 150 may take any type of form. For example, rather than being a strap, removable electronics module 150 could resemble a circular or square piece of material (e.g., rubber or nylon).

The inertial measurement unit(s) (IMU(s)) 158 can generate sensor data indicative of a position, velocity, and/or an acceleration of the interactive object. The IMU(s) 158 may generate one or more outputs describing one or more three-dimensional motions of the interactive object 104. The IMU(s) may be secured to the internal electronics module 124, for example, with zero degrees of freedom, either removably or irremovably, such that the inertial measurement unit translates and is reoriented as the interactive object 104 is translated and are reoriented. In some embodiments, the inertial measurement unit(s) 158 may include a gyroscope or an accelerometer (e.g., a combination of a gyroscope and an accelerometer), such as a three axis gyroscope or accelerometer configured to sense rotation and acceleration along and about three, generally orthogonal axes. In some embodiments, the inertial measurement unit(s) may include a sensor configured to detect changes in velocity or changes in rotational velocity of the interactive object and an integrator configured to integrate signals from the sensor such that a net movement may be calculated, for instance by a processor of the inertial measurement unit, based on an integrated movement about or along each of a plurality of axes.

Communication interface 162 enables the transfer of power and data (e.g., the touch-input detected by sensing circuitry 126) between the internal electronics module 124 and the removable electronics module 260. In some implementations, communication interface 162 may be implemented as a connector that includes a connector plug and a connector receptacle. The connector plug may be implemented at the removable electronics module 150 and is configured to connect to the connector receptacle, which may be implemented at the interactive object 104.

In system 190, the removable electronics module 150 includes a microprocessor 152, power source 154, and network interface 156. Power source 154 may be coupled, via communication interface 162, to sensing circuitry 126 to provide power to sensing circuitry 126 to enable the detection of touch-input, and may be implemented as a small battery. When touch-input is detected by sensing circuitry 126 of the internal electronics module 124, data representative of the touch-input may be communicated, via communication interface 162, to microprocessor 152 of the removable electronics module 150. Microprocessor 152 may then analyze the touch-input data to generate one or more control signals, which may then be communicated to a computing device 106 (e.g., a smart phone, server, cloud computing infrastructure, etc.) via the network interface 156 to cause the computing device to initiate a particular functionality. Generally, network interfaces 156 are configured to communicate data, such as touch data, over wired, wireless, or optical networks to computing devices. By way of example and not limitation, network interfaces 156 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 110 of FIG. 1 and FIG. 2).

Object 104 may also include one or more output devices configured to provide a haptic response, a tactical response, an audio response, a visual response, or some combination thereof. Similarly, removable electronics module 206 may include one or more output devices configured to provide a haptic response, tactical response, and audio response, a visual response, or some combination thereof. Output devices may include visual output devices, such as one or more light-emitting diodes (LEDs), audio output devices such as one or more speakers, one or more tactile output devices, and/or one or more haptic output devices. In some examples, the one or more output devices are formed as part of removable electronics module, although this is not required. In one example, an output device can include one or more LEDs configured to provide different types of output signals. For example, the one or more LEDs can be configured to generate a circular pattern of light, such as by controlling the order and/or timing of individual LED activations. Other lights and techniques may be used to generate visual patterns including circular patterns. In some examples, one or more LEDs may produce different colored light to provide different types of visual indications. Output devices may include a haptic or tactile output device that provides different types of output signals in the form of different vibrations and/or vibration patterns. In yet another example, output devices may include a haptic output device such as may tighten or loosen an interactive garment with respect to a user. For example, a clamp, clasp, cuff, pleat, pleat actuator, band (e.g., contraction band), or other device may be used to adjust the fit of a garment on a user (e.g., tighten and/or loosen). In some examples, an interactive textile may be configured to tighten a garment such as by actuating conductive threads within the touch sensor 102.

A gesture manager is capable of interacting with applications at computing devices 106 and touch sensor 102 effective to aid, in some cases, control of applications through touch-input received by touch sensor 102. For example, a gesture manager can interact with applications. In FIG. 2, a gesture manager can be implemented at removable electronics module 150, internal electronics module 124, a computing device 106 remote from the interactive object, or some combination thereof. A gesture manager may be implemented as a standalone application in some embodiments. In other embodiments, a gesture manager may be incorporated with one or more applications at a computing device.

A gesture or other predetermined motion can be determined based on touch data detected by the touch sensor 102 and/or an inertial measurement unit 158 or other sensor. For example, a gesture manager can determine a gesture based on touch data, such as single-finger touch gesture, a double-tap gesture, a two-finger touch gesture, a swipe gesture, and so forth. As another example, a gesture manager can determine a gesture based on movement data such as a velocity, acceleration, etc. as can be determined by inertial measurement unit 158.

A functionality associated with a gesture can be determined by gesture manager and/or an application at a computing device. In some examples, it is determined whether the touch data corresponds to a request to perform a particular functionality. For example, the gesture manager determines whether touch data corresponds to a user input or gesture that is mapped to a particular functionality, such as initiating a vehicle service, triggering a text message or other notification associated with a vehicle service, answering a phone call, creating a journal entry, and so forth. As described throughout, any type of user input or gesture may be used to trigger the functionality, such as swiping, tapping, or holding touch sensor 102. In one or more implementations, a gesture manager enables application developers or users to configure the types of user input or gestures that can be used to trigger various different types of functionalities. For example, a gesture manager can cause a particular functionality to be performed, such as by sending a text message or other communication, answering a phone call, creating a journal entry, increase the volume on a television, turn on lights in the user's house, open the automatic garage door of the user's house, and so forth.

While internal electronics module 124 and removable electronics module 150 are illustrated and described as including specific electronic components, it is to be appreciated that these modules may be configured in a variety of different ways. For example, in some cases, electronic components described as being contained within internal electronics module 124 may be at least partially implemented at the removable electronics module 150, and vice versa. Furthermore, internal electronics module 124 and removable electronics module 150 may include electronic components other that those illustrated in FIG. 2, such as sensors, light sources (e.g., LED's), displays, speakers, and so forth.

Figure 3:
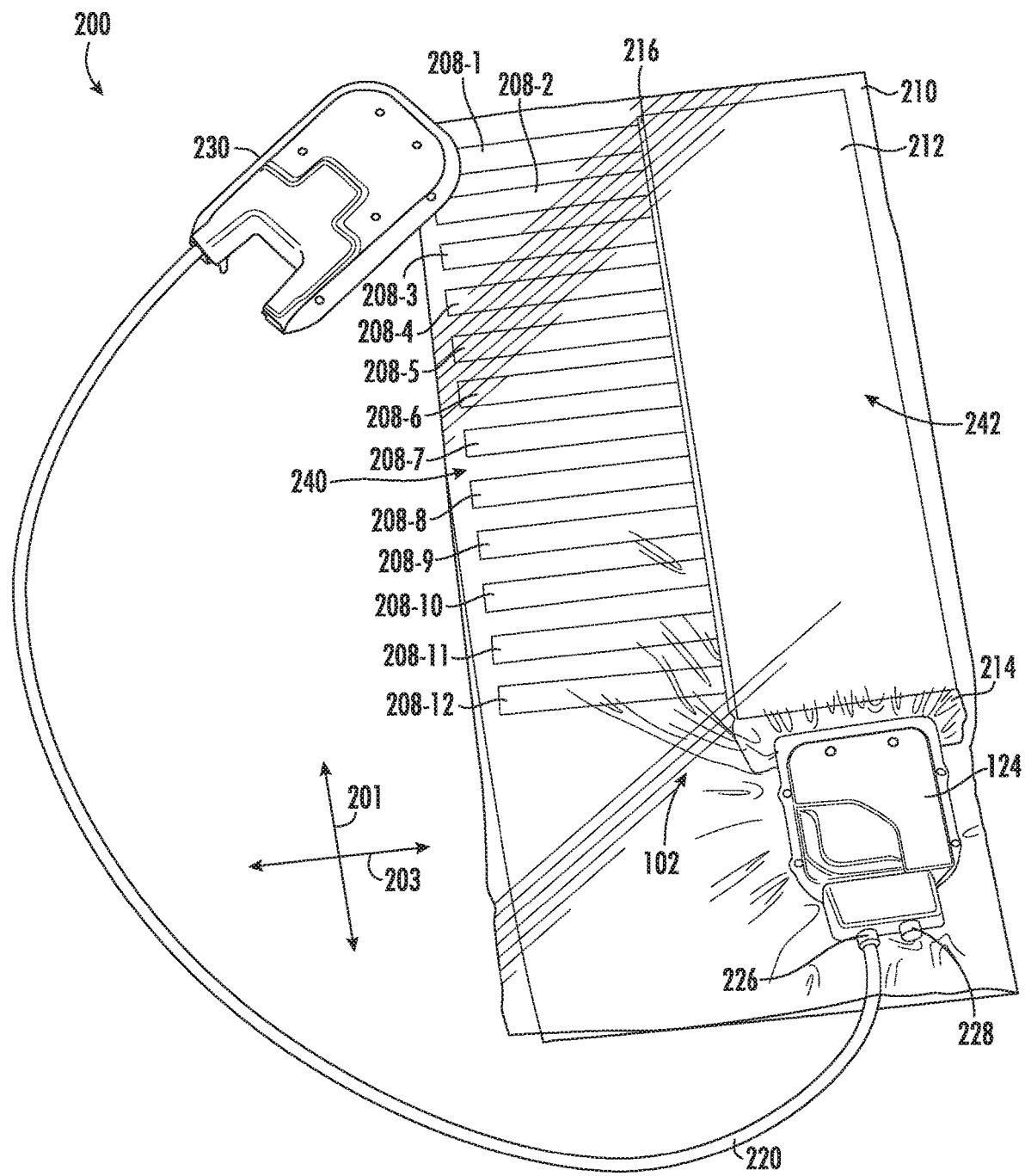
FIG. 3 is a front perspective view depicting an example of a pre-fabricated sensor assembly in accordance with example embodiments of the present disclosure.
Figure 4:
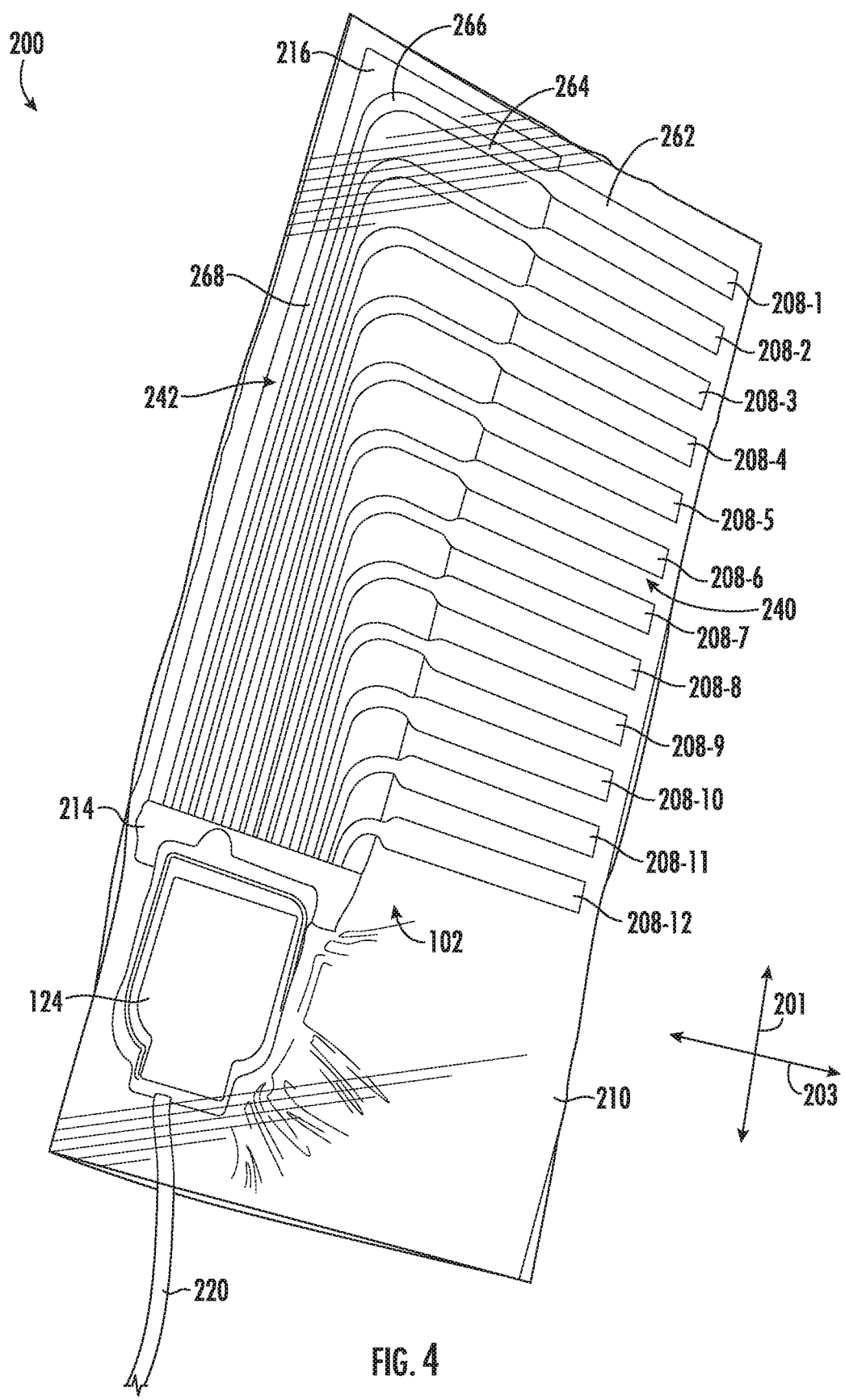
FIG. 4 is a back perspective view of the example pre-fabricated sensor assembly depicted in FIG. 3 in accordance with example embodiments of the present disclosure.
Figure 5:
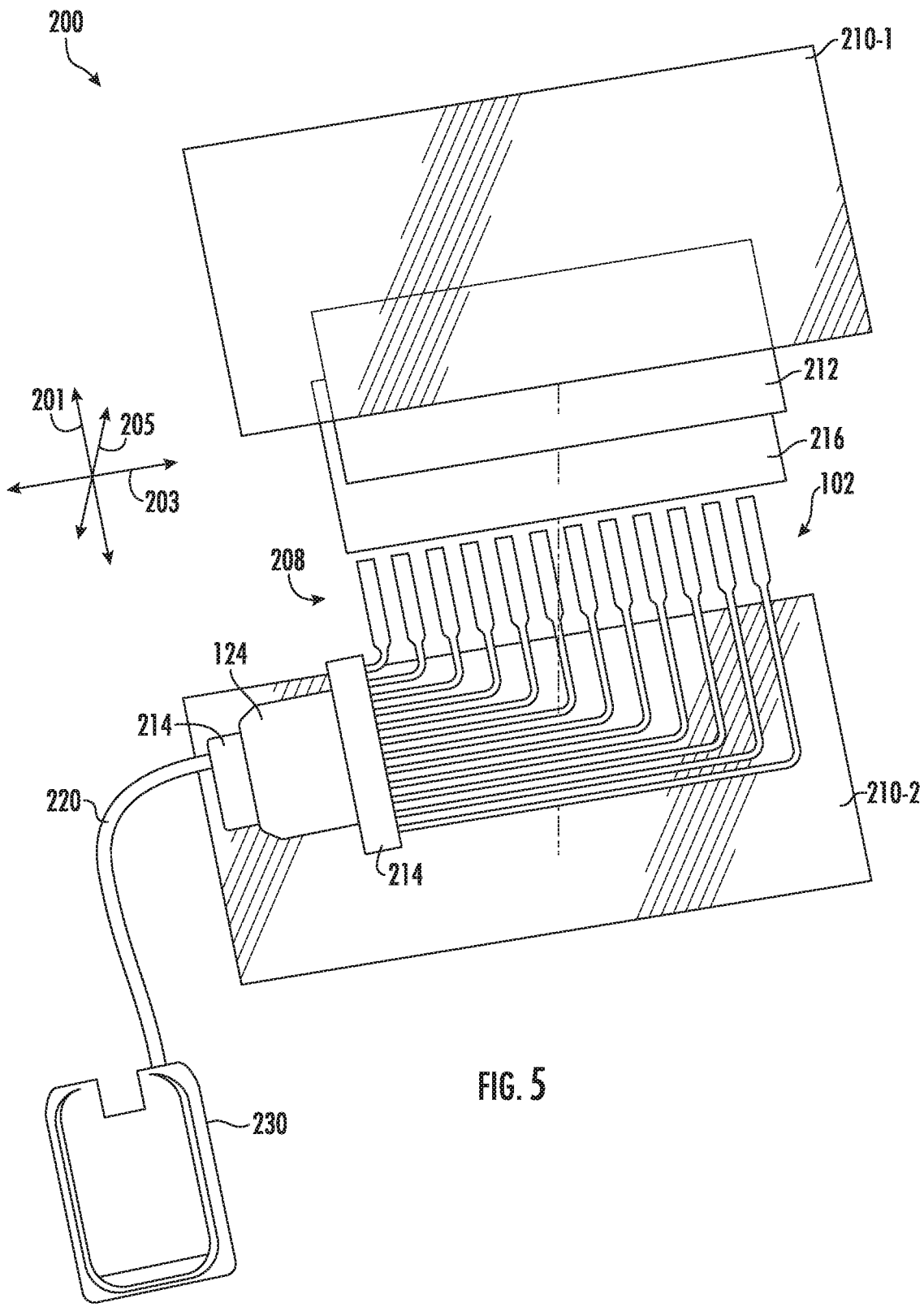
FIG. 5 is an exploded perspective view of the example pre-fabricated sensor assembly depicted in FIG. 3 in accordance with example embodiments of the present disclosure.
Figure 6:
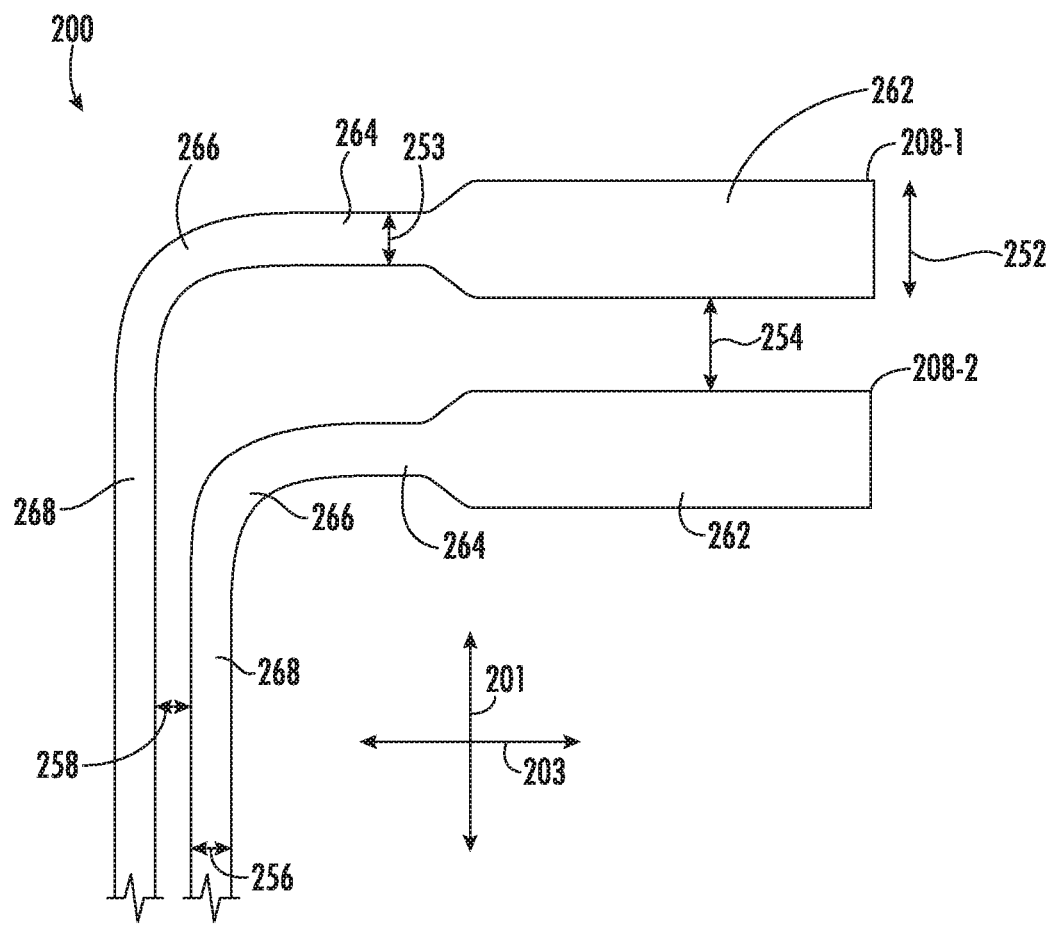
FIG. 6 is a top detailed view of a subset of the sensing lines of the example pre-fabricated sensor assembly depicted in FIG. 3 in accordance with example embodiments of the present disclosure.

FIGS. 3-5 depict an example of a pre-fabricated sensor assembly 200 in accordance with example embodiments of the present disclosure. FIGS. 3 and 4 depict a top perspective view and a bottom perspective view of sensor assembly 200, respectively. FIG. 5 depicts an exploded perspective view of an example set of layers that can be used to form the pre-fabricated sensor assembly 200. FIG. 6 depicts a close-up view of a subset of the sensing lines used to form the capacitive touch sensor for sensor assembly 200.

Pre-fabricated sensor assembly 200 includes a touch sensor 102 that is formed from a plurality of conductive lines 208-1 through 208-12. Conductive lines 208-1 through 208-12 are one example of sensing lines 108. Conductive lines 208-1 through 208-12 extend in a lateral direction parallel to a lateral axis 203 at a touch-sensitive area 240 of the touch sensor 102. Touch sensor 102 is a capacitive touch sensor in example embodiments. Conductive lines 208-1 through 208-12 include a curved section 266 that connects the lateral section 262 of each conductive line to a longitudinal section 268 of each conductive line that extends in a direction parallel to longitudinal axis 201. The conductive lines are coupled to a connecting ribbon 214 with can be utilized to position the conductive lines for connection to a plurality of electrical contact pads (not shown) of internal electronics module 124. The plurality of conductive lines 208-1 through 208-2 can be collected and organized using ribbon 214 with a pitch that matches a corresponding pitch of connection points of an electronic component such as a component of internal electronics module 124.

The longitudinal section 268 of each conductive line extends in the longitudinal direction at a non-touch-sensitive area 242 of the touch sensor 102. More particularly, one or more shield layers 212 are formed over the longitudinal portion of each conductive line to form the non-touch-sensitive area 242. One or more adhesive layers 216 may be utilized to couple the plurality of conductive lines to the one or more shield layers 212 while optionally providing insulation therebetween. In some examples, the one or more shield layers 212 can be a conductive shield layer that is formed from the same or a similar material to conductive lines 208. In other examples, the one or more shield layers 212 may be one or more insulating layers. By utilizing the one or more shield layers 212, the touch-sensitive area 240 can be selectively formed at a desirable location of the touch sensor 102. In this particular example, the one or more shield layers 212 can be utilized to form a capacitive touch sensor that includes sensing lines that extend in the lateral direction with a spacing therebetween in the longitudinal direction. The longitudinal portion of each conductive line can be covered by the one or more shield layers 212 so that the touch sensor 102 is not touch-sensitive at that area. One or more shield layers may provide a ground in some examples. For instance, a ground can be provided for electrical fields originating in an area associated with the non-touch-sensitive area due to an approaching object such as a user's finger.

Internal electronics module 124 may include sensing circuitry (not shown) in electrical communication with the plurality of conductive lines 208-1 through 208-12. Internal electronics module 124 may include one or more communication ports. In the example of FIG. 3, internal electronics module 124 includes a first communication port and a second communication port 228. The first communication port 226 is coupled to a first end portion of the communications cable 220. Communications cable 220 is one example of a portion of a communication interface 162 as shown in FIG. 2. Communication cable 220 includes a second end portion that is coupled to a receptacle 230. Receptacle 230 is configured to removably connect a second electronics module (not shown) to the pre-fabricated sensor assembly 200 via communication cable 220. Receptacle 230 may be manufactured from a plastic, metal, polymer, or other suitable material. Receptacle 230 can include one or more electrical contacts not shown for electrically coupling the removable electronics module to the pre-fabricated sensor assembly 200. The receptacle can extend at least partially outside of the one or more flexible retaining layers to enable removable connection of an electronics module in some examples.

With reference to FIG. 5, pre-fabricated sensor assembly 200 may include an upper flexible retaining layer 210-1 and a lower flexible retaining layer 210-2. Between the encapsulation layers can be formed one or more shield layers 212, one or more adhesive layers 216, a set of conductive lines 208, and an internal electronics module 124. In some examples, a portion of communication cable 220 can be formed between the encapsulation layers as shown. In some examples, a single flexible retaining layer 210 may be utilized while still forming a housing for enclosing the touch sensor 102 and optionally other components such as internal electronics module 124. For instance, a single flexible retaining layer 210 may be folded with the touch sensor 102 and internal electronics module 124 formed therebetween.

The one or more flexible retaining layers can at least partially surround the first electronics module and the plurality of flexible sensing lines of the capacitive touch sensor. The communication cable can extend from within the housing of the one or more flexible retaining layers to outside of the one or more flexible retaining layers. The receptacle extends at least partially outside of the one or more flexible retaining layers to enable removable connection of the second electronics module.

The set of conductive lines 208, ribbon 214, and internal electronics module 124 can be positioned in a predetermined arrangement or layout. Adhesive layer 216 and shield layer 212 can be positioned in a target location where the non-touch-sensitive area 242 is to be formed. The flexible retaining layers 210-1 and 210-2 can be positioned over in contact with the one or more shield layers 212 and under in contact with the set of conductive lines and internal electronics module 124. A vacuum sealing, thermal, pressure, bonding, or other technique may be utilized to adhere the top flexible retaining layer 210-1 to the bottom flexible retaining layer 210-to, thereby enclosing the internal elements within a housing formed by the applicable retaining layers. More particularly, internal electronics module 124 and the set of conductive lines 208 of the touch sensor 102 can be formed within a housing that is made by the flexible retaining layers 210-1 and 210-2.

With reference to FIG. 6, further details of the spacing and arrangement of conductive lines 208 in the example of pre-fabricated sensor assembly 200 is illustrated. A close-up view of a touch sensor is depicted showing a subset of the conductive lines including conductive line 208-1 and conductive line 208-2. Each conductive line includes a first lateral section 262 that extends in a direction parallel to lateral axis 203, a second lateral section 264 that extends in the direction parallel the lateral axis 203, and a longitudinal section 268 that extends in a longitudinal direction parallel to the longitudinal axis 201. Longitudinal section 268 is connected to the second lateral section 264 by curved section 266.

The first lateral section 262 of each conductive line 208 has a width 252. The second lateral section 264 has a smaller width 253. The second lateral portion of each sensing line can have a length that is different than each other second lateral portion. In this manner, the second portion of each flexible sensing line of the plurality of flexible sensing lines can have a length that is different than a length of the second portion of each other flexible sensing line of the plurality of flexible sensing lines.

The longitudinal section 268 includes an even smaller width 256. The lateral section 262 of the first conductive line 208-1 is separated from the lateral section 262 of second conductive line 208-2 by a distance 254. The longitudinal section 268 of the first conductive line 208-1 is separated from the longitudinal section 268 of the second conductive line 208-2 by a distance 258. The distance 254 between the lateral sections is greater than the distance 258 between the longitudinal section. Such a configuration can enable a sufficient spacing to be utilized in the touch-sensitive area to receive and distinguish touch inputs utilizing the conductive lines. Moreover, such a configuration can enable a smaller spacing to be utilized at the non-touch-sensitive area so as to conserve space and ultimately make a more compact device. Additionally, the decreased spacing and width of the longitudinal extents can enable a tighter pitch to be utilized when connecting to ribbon 214 and ultimately to the sensing circuitry within internal electronics module 124. In such a manner, a tight or small spacing can be utilized to conserve space where connections are made but a larger spacing can be utilized at other areas where a touch input is desired to be detected.

In some examples, each sensing line of the plurality of flexible sensing lines can include a multilayered flexible film. The multilayered flexible film can include at least a flexible base layer and a metal layer that overlies the flexible base layer. In some examples, each sensing line of the plurality of flexible sensing lines includes a passivation layer that overlies the flexible base layer and separates the flexible base layer from the metal layer. For example, one or more passivation layers may be utilized to increase adhesion of the sensing lines to other surfaces. A electromagnetic field shielding fabric can be used to form the sensing lines in some examples.

In some examples, a continuous adhesive layer 216 can be coupled to a first surface of each of the plurality of flexible sensing lines. The continuous adhesive layer can be provided within the housing defined by the one or more flexible retaining layers.

In FIGS. 3-6, each sensing line of the plurality of flexible sensing lines 208 includes a longitudinal section 268 that extends in a first direction at a first portion of the pre-fabricated sensor assembly and a second section 264 and/or 262 that extends in a second direction at a second portion of the pre-fabricated sensor assembly. The first direction and the second direction can be substantially orthogonal. A width of the first portion of each sensing line can be less than a width of the second portion of each sensing line.

In some examples, the capacitive touch sensor comprises an adhesive layer 216 including a first surface coupled to the longitudinal section 268 of each sensing line. The adhesive layer can include a second surface. A shield layer can be coupled to the second surface of the adhesive layer. The shield layer can extend over at least the wanted to longitudinal portion of each sensing line to provide a ground for electrical fields that result from touch input at the first portion of each sensing line. The lateral section 262 of each of the plurality of flexible sensing lines extends beyond an outer perimeter of the shield layer in some examples. In some examples, adhesive layer 216 and shield layer 212 can be combined into a single layer that includes both adhesive and shielding properties.

A similar pre-fabricated sensor assembly may additionally or alternatively include other types of sensors. For example, resistive touch sensors can be formed in a similar manner to capacitive touch sensors as described. Other types of sensors such as inertial measurement units, strain gauges, ultrasonic sensors, radar-based touch interfaces, image-based sensors, infrared sensors, etc. can be integrated within flexible retaining layers as described.

Figure 7:
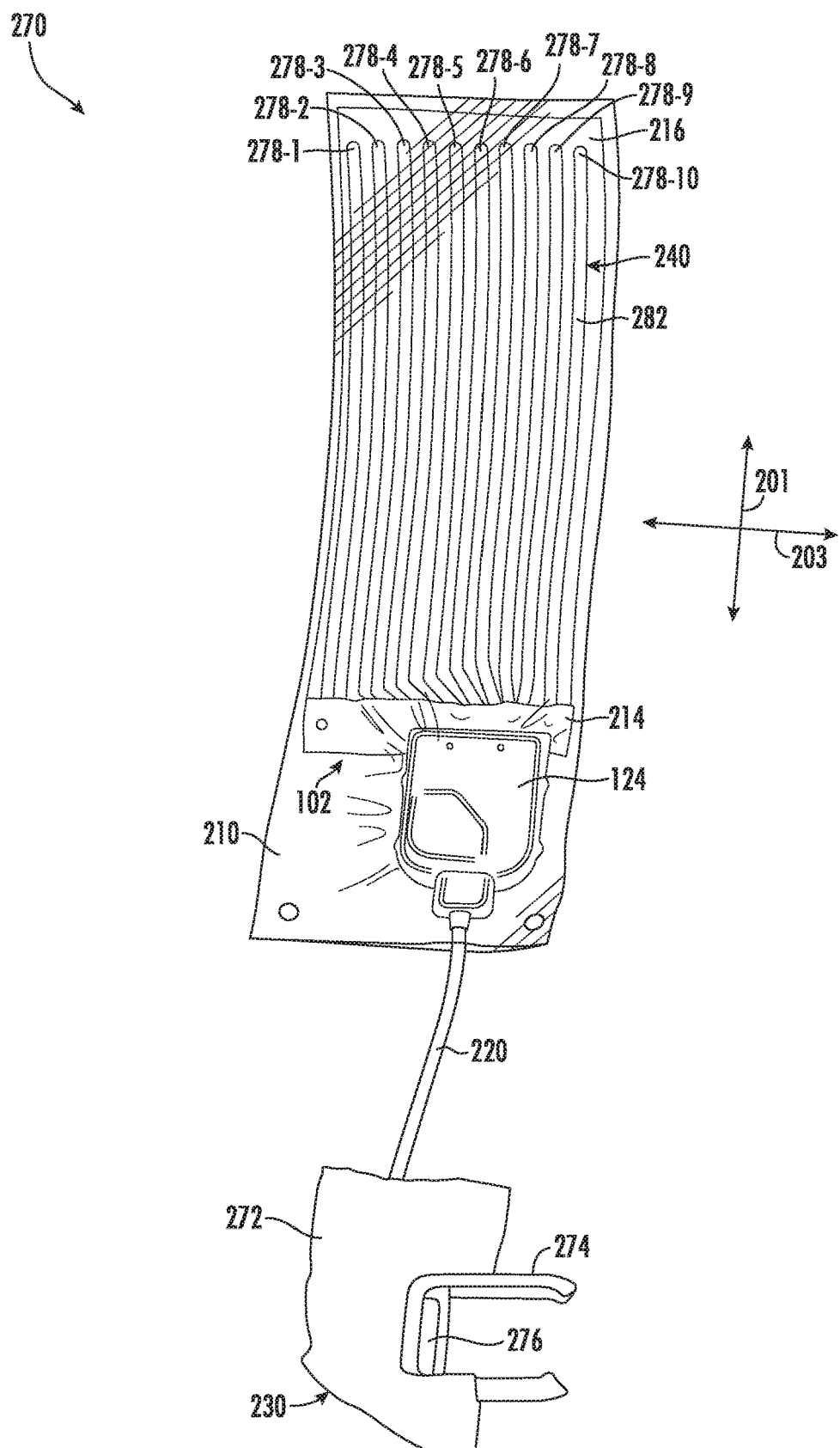
FIG. 7 is a front perspective view depicting another example of a pre-fabricated sensor assembly in accordance with example embodiments of present disclosure.
Figure 8:
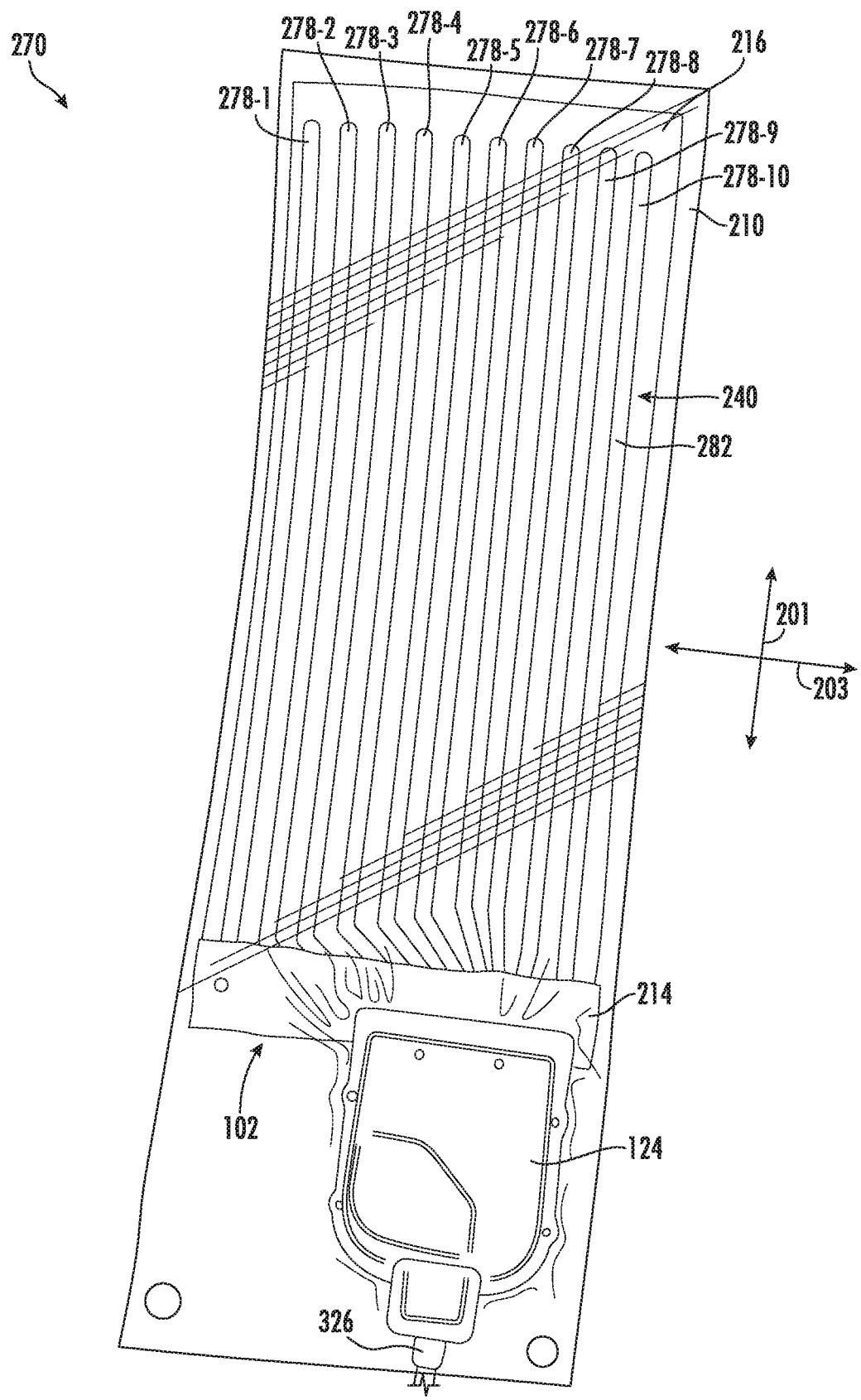
FIG. 8 is a detailed view of the example pre-fabricated sensor assembly depicted in FIG. 7 in accordance with example embodiments of the present disclosure.

FIGS. 7 and 8 depict a pre-fabricated sensor assembly 270 in accordance with another example embodiment of the disclosed technology. FIG. 7 is a front perspective view of the pre-fabricated sensor assembly 270 and FIG. 8 is a front detailed perspective view of the example pre-fabricated sensor assembly 270.

A plurality of sensing lines 278-1 through 278-10 comprising a multilayered film as described with respect to FIGS. 3-6 can be used. In FIG. 7, the plurality of conductive lines extend in a single direction (e.g., parallel to a direction of a longitudinal axis) to form a touch-sensitive area 240 of touch sensor 102. Touch sensor 102 can be configured as a capacitive touch sensor or resistive touch sensor in example embodiments.

The plurality of sensing lines are separated by a first spacing at a first portion of the capacitive touch sensor configured to receive touch input. A smaller or tighter spacing between the plurality of conductive lines can be utilized at second portion of the capacitive touch sensor where the sensing lines 278 are routed or otherwise positioned for attachment to the internal electronics module 124. In this example it can be seen that plurality of sensing lines have a tighter pitch or spacing at the second portion just prior to connection to the internal electronics module 124. In this manner, even though a single direction is utilized for the capacitive touch sensor, a tighter spacing can be provided to properly align the set of sensing lines 278 with electrical contact pads of the internal electronics module 124. In some examples, this arrangement can facilitate a tighter or more compact device architecture. Sensing lines can connect to the internal electronics with a small spacing, while also providing a larger spacing between the sensing lines at a touch-sensitive area of the capacitive touch sensor designed to receive touch input.

The plurality of sensing lines 278 of the pre-fabricated sensor assembly 300 can be attached to a flexible substrate.

The flexible substrate can include continuous flexible substrate that attaches to each of the plurality conductive lines. In some examples, the flexible substrate comprises one or more adhesive layers 216 having an upper surface coupled to a lower surface of the flexible base layer of each of the plurality of conductive lines. Other types of flexible substrates may be used in other examples.

By utilizing a continuous flexible substrate that is attached to the plurality of sensing lines, a predefined layout of the plurality of sensing life can be maintained. The predefined layout can be maintained while also providing a flexible structure. The flexible sensing lines and the substrate to which they are attached, in conjunction with flexible retaining layers, etc., can provide a pre-fabricated sensor assembly 300 that enables an efficient and simple technique for integrating a passive touch sensor into a base substrate of an existing object.

Communication cable 220 includes a first in portion coupled to a port 326 of internal electronics module 124 and the second in portion coupled to receptacle 230. In this example, receptacle 230 includes or is otherwise attached to a flexible attachment member 272. The flexible attachment member 272 can include a textile fabric or other flexible material in various embodiments. Flexible attachment member 272 can enable the attachment of receptacle 230 to an interactive object. For example, flexible attachment member 272 may be sewn to a substrate that is used to form an interactive object, enabling the receptacle 230 to be affixed to the interactive object. In this example, receptacle 230 includes a connector 276 in one or more support members 274 configured to removably connect the removable electronics module to the prefabricated sensor assembly. The particular arrangement of receptacle 230 enables a removal electronics module 150 to be inserted within the extending support members 274 of receptacle 230 so that removable electronics module can be securely attached to receptacle 230 and thereby to an interactive object including the pre-fabricated sensor assembly 300.

Figure 9:
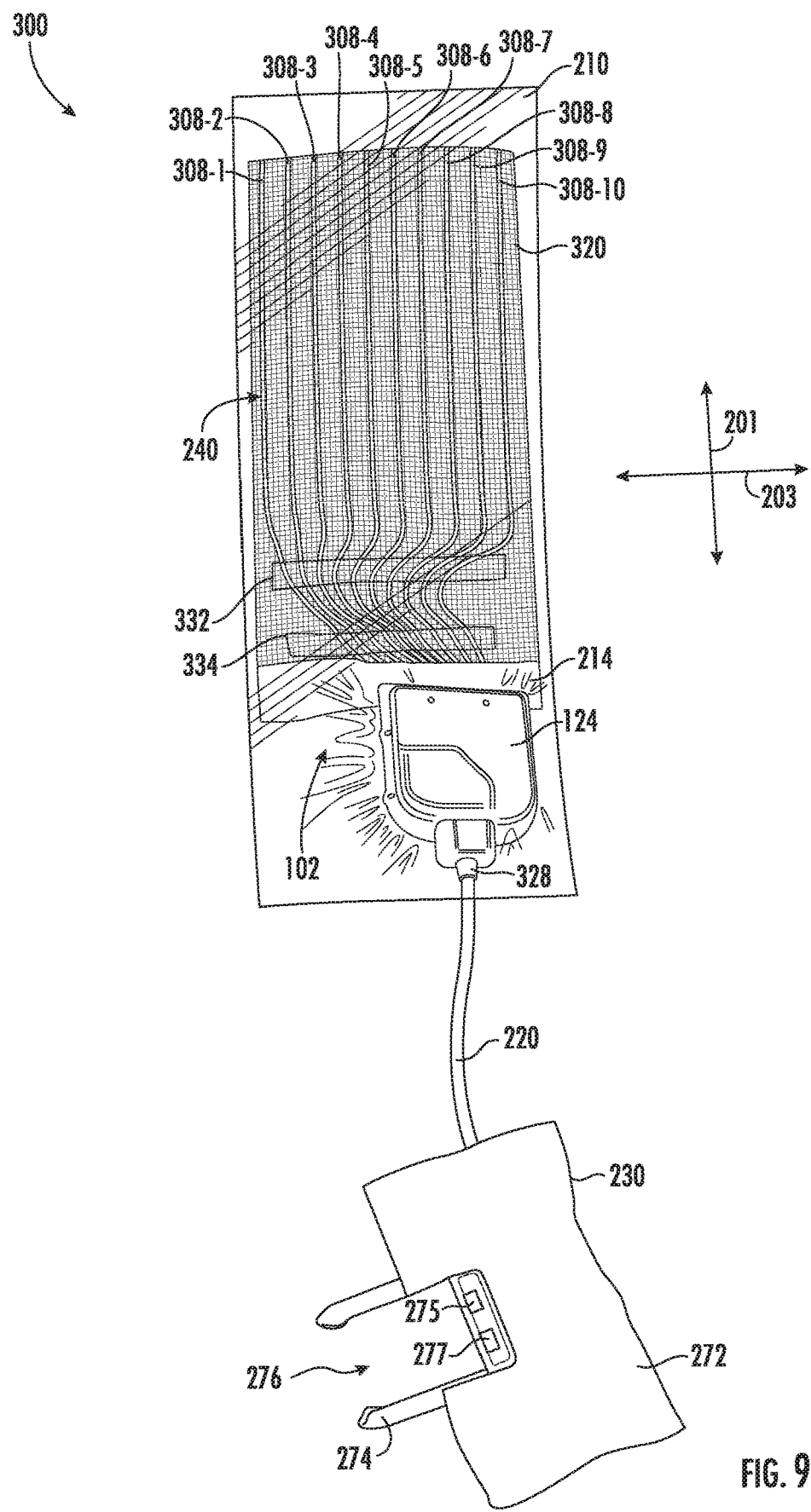
FIG. 9 is a front perspective view depicting an example of a pre-fabricated sensor assembly including conductive threads implemented as a set of conductive lines for a capacitive touch sensor in accordance with example embodiments of the present disclosure.
Figure 10:
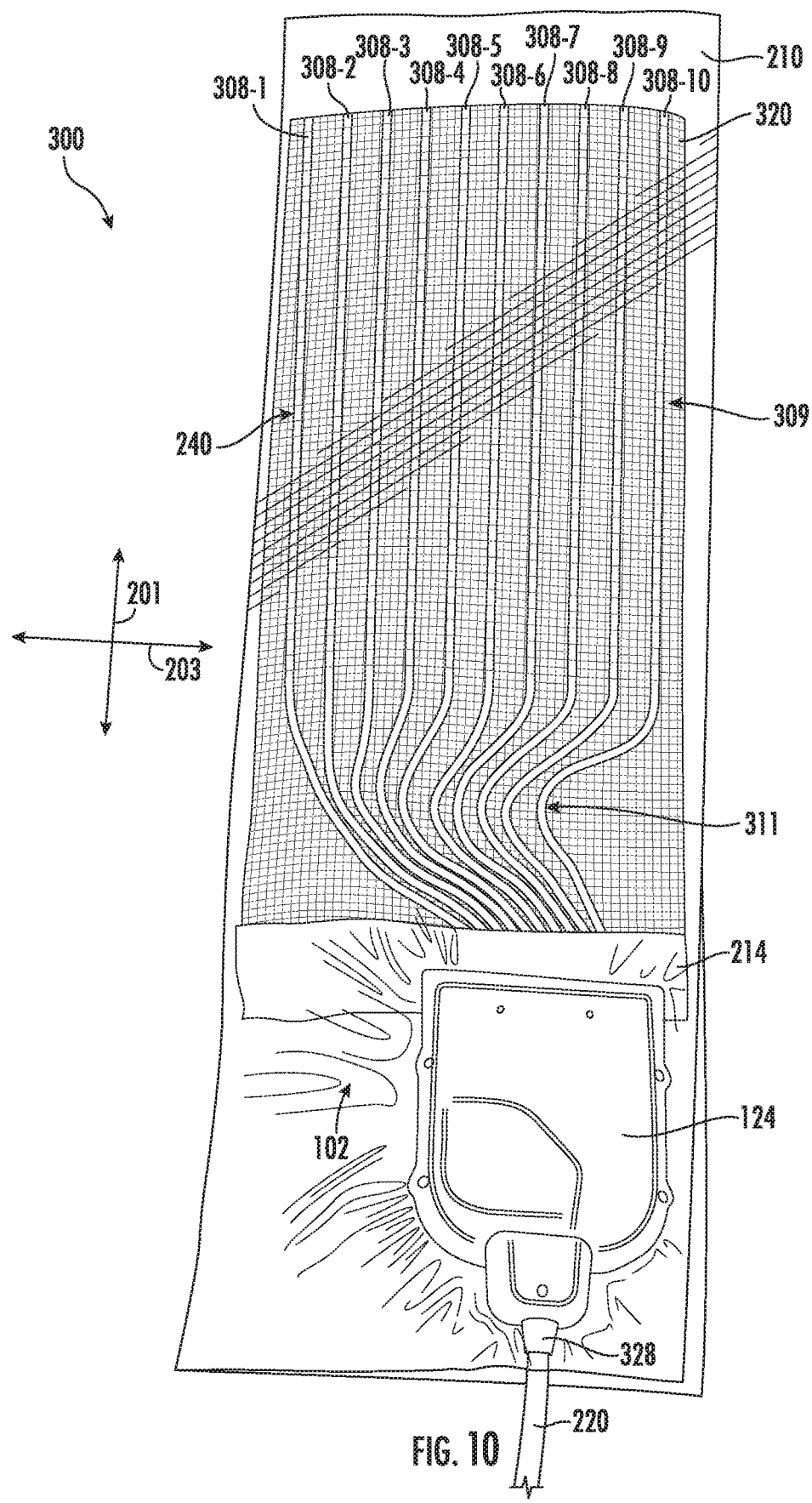
FIG. 10 is a detailed view of the example pre-fabricated sensor assembly depicted in FIG. 9 in accordance with example embodiments of the present disclosure.

FIGS. 9 and 10 illustrate another example of a pre-fabricated sensor assembly 300 in accordance with example embodiments of the present disclosure. FIG. 9 is a front perspective view of a sensor assembly 300 depicting a touch sensor 102, internal electronics module 124, and receptacle 230. FIG. 10 is a close-up front perspective view of sensor assembly 300 depicting additional details of touch sensor 102 and internal electronics module 124. Touch sensor 102 can be configured as a capacitive touch sensor or resistive touch sensor in example embodiments.

Pre-fabricated sensor assembly 300 includes one or more flexible retaining layers 210 that form a housing that encloses a touch sensor 102 and internal electronics module 124 as earlier described. More particularly, the one more flexible retaining layers at least partially surround touch sensor 102 and internal electronics module 124 to provide stability and to maintain a predefined arrangement and positioning of conductive threads 308-1 through 308-10 that form the touch sensor 102 in this example. Touch sensor 102 can be configured as a capacitive touch sensor or resistive touch sensor in example embodiments.

Conductive threads 308-1 through 308-10 are formed on or within a textile-based substrate 320. By way of example, textile-based substrate 320 may be formed by weaving, embroidering, stitching, or otherwise integrating conductive threads 308-1 through 308-10 with a set of nonconductive threads. In the example of FIG. 9, each conductive thread 308 includes a longitudinal portion 309 that extends in a longitudinal direction. Collectively the longitudinal portions of each conductive thread form a touch-sensitive area 340 for the touch sensor 102. Each conductive thread can include a loose portion 311 which is loose from the textile-based substrate 320. The loose portion 311 of each conductive thread can be formed by not weaving, embroidering, etc. the loose portions 311 with the nonconductive threads when forming textile-based substrate 320. The loose portions 311 may enable a more efficient and/or easy connection of the conductive threads to sensing circuitry within internal electronic module 124. As illustrated, the pitch between the conductive threads where they connect to the internal electronics module may be less than the pitch between the conductive threads at the touch-sensitive area 340. Such a design can enable a suitable spacing and arrangement of the conductive threads where the touch-sensitive area(s) are formed, while providing a tighter pitch to enable a compact arrangement where the conductive threads are connected to the sensing circuitry. In a particular example of FIG. 9, a ribbon 214 is utilized to gather and position the conductive threads at a pitch corresponding to a set of electrical contact pads (not shown) of internal electronics module 124. Ribbon 214 can be utilized to collect and organize the plurality of conductive threads 308 into a ribbon with a pitch that matches a corresponding pitch of connection points of an electronic component such as the sensing circuitry of internal electronics module 124.

An optional set of stabilizing members 332 and 334 are provided to selectively couple the loose portions 311 to the textile substrate to better facilitate positioning of the conductive threads relative to the ribbon 214. It is noted that stabilizing members 332 and 334 are optional. In some examples, stabilizing members 332 and 334 are formed from a film or other flexible material.

Internal electronics module 124 includes a single port 328 coupled to a first portion of communication cable 220. A second and portion of communication cable 220 is coupled to a receptacle 230. In this example, receptacle 230 includes or is otherwise attached to a flexible attachment member 272. The flexible attachment member 272 can include a textile fabric or other flexible material in various embodiments. Flexible attachment member 272 can enable the attachment of receptacle 230 to an interactive object. For example, flexible attachment member 272 may be sewn to a substrate that is used to form an interactive object, enabling the receptacle 230 to be affixed to the interactive object. In this example, receptacle 230 includes a connector 276 having a set of electrical contact pads 275 and 277. In other examples, more or fewer electrical contacts may be utilized. The particular arrangement of receptacle 230 enables a removal electronics module 150 to be inserted within the extending members of receptacle 230 so that removable electronics module can be securely attached to receptacle 230 and thereby to an interactive object including the pre-fabricated sensor assembly 300.

Figure 11:
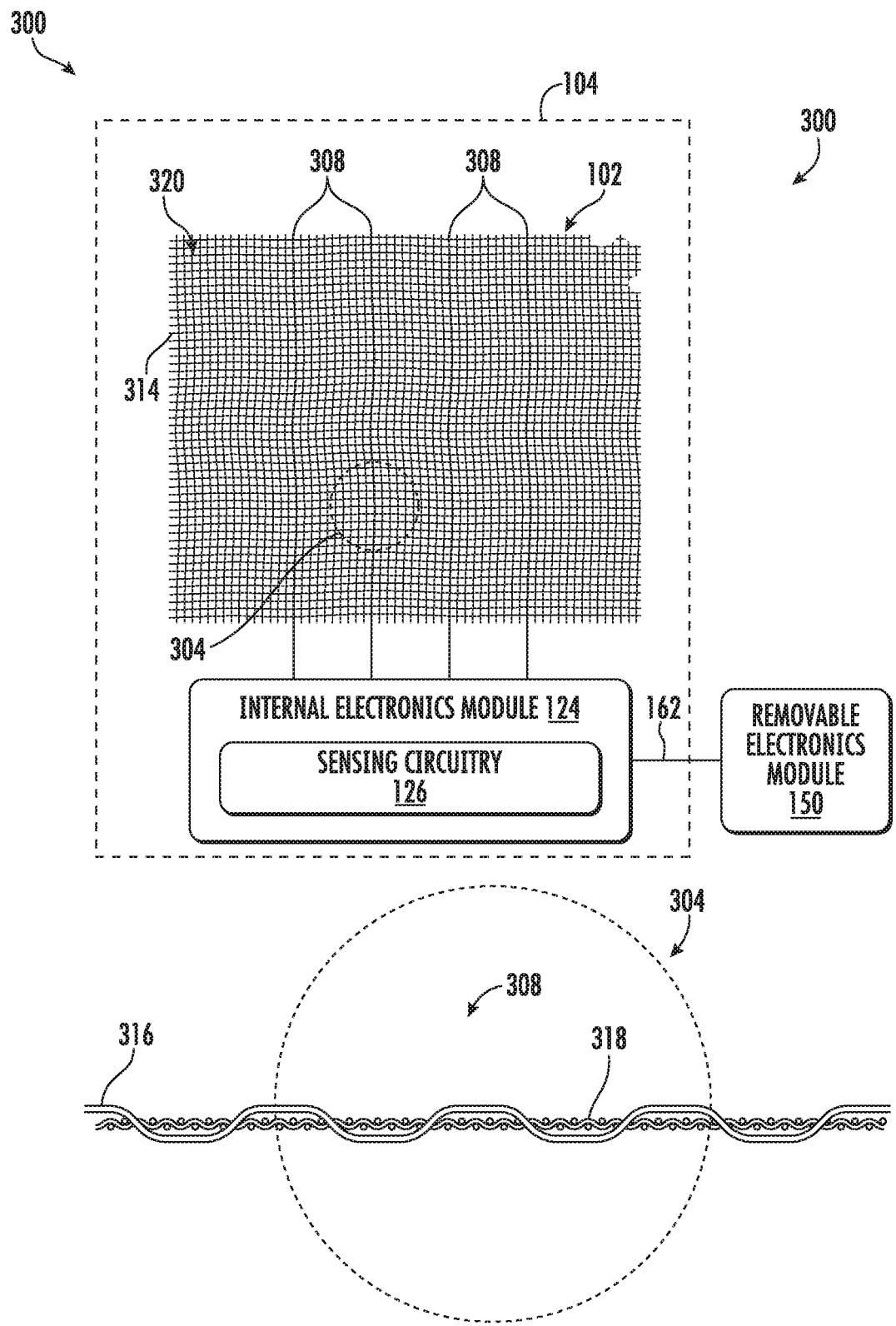
FIG. 11 illustrates an example of an interactive object with multiple electronics modules in accordance with example embodiments of the present disclosure.

FIG. 11 illustrates an example 300 of interactive object 104 with multiple electronics modules in accordance with one or more implementations. In this example, touch sensor 102 of the interactive object 104 includes non-conductive threads 314 woven with conductive threads 308 to form touch sensor 102 (e.g., interactive textile). Non-conductive threads may correspond to any type of non-conductive thread, fiber, or fabric, such as cotton, wool, silk, nylon, polyester, and so forth. Touch sensor 102 can be configured as a capacitive touch sensor or resistive touch sensor in example embodiments. Together, non-conductive threads 314 and conductive threads 308 form a textile or textile-based substrate 320.

At 304, a zoomed-in view of conductive thread 308 is illustrated. Conductive thread 308 includes a conductive wire 316 or a plurality of conductive filaments that are twisted, braided, or wrapped with a flexible thread 318. As shown, the conductive thread 308 can be woven or otherwise integrated with the non-conductive threads to form a fabric or a textile-based substrate 320. Although a conductive thread and textile is illustrated, it will be appreciated that other sensing lines and substrates may be used, such as flexible metal lines formed on a plastic substrate.

In one or more implementations, conductive thread 308 includes a thin copper wire. It is to be noted, however, that the conductive thread 308 may also be implemented using other materials, such as silver, gold, or other materials coated with a conductive material. The conductive thread 308 may include an outer cover layer formed by braiding together non-conductive threads. The non-conductive threads may be implemented as any type of flexible thread or fiber, such as cotton, wool, silk, nylon, polyester, and so forth.

Touch sensor 102 can be formed efficiently and in a low-cost manner, using any conventional weaving process (e.g., jacquard weaving or 3D-weaving), which involves interlacing a set of longer threads (called the warp) with a set of crossing threads (called the weft). Weaving may be implemented on a frame or machine known as a loom, of which there are a number of types. Thus, a loom can weave non-conductive threads 322 with conductive threads 308 to create touch sensor 102.

The conductive threads 308 can be woven into the touch sensor 102 in any suitable pattern or array. In one embodiment, for instance, the conductive threads 308 may form a single series of parallel threads. For instance, in one embodiment, the capacitive touch sensor may comprise a single plurality of parallel conductive threads conveniently located on the interactive object, such as on the sleeve of a jacket. In an alternative embodiment, the conductive threads 308 may form a grid.

In the example of pre-fabricated sensor assembly 300, conductive thread 308 is woven into touch sensor 102 to form a grid that includes a single set of substantially parallel conductive threads 308. In other examples, a second set of substantially parallel conductive threads 308 crosses the first set of conductive threads can be to form a grid.

In such an example (not shown), the first set of conductive threads through a are oriented horizontally and the second set of conductive threads 308 are oriented vertically, such that the first set of conductive threads through a are positioned substantially orthogonal to the second set of conductive threads 308. It is to be appreciated, however, that conductive threads 308 may be oriented such that crossing conductive threads 308 are not orthogonal to each other. For example, in some cases crossing conductive threads 308 may form a diamond-shaped grid. While conductive threads 308 are illustrated as being spaced out from each other in FIG. 11, it is to be noted that conductive threads 308 may be weaved very closely together. For example, in some cases two or three conductive threads may be weaved closely together in each direction. Further, in some cases the conductive threads may be oriented as parallel sensing lines that do not cross or intersect with each other.

In the example of pre-fabricated sensor assembly 300, sensing circuitry 126 is shown as being integrated within object 104, and is directly connected to conductive threads 308. During operation, sensing circuitry 126 can determine positions of touch-input on the conductive threads 308 using self-capacitance sensing or projective capacitive sensing. For example, sensing circuitry 126 can detect a change in capacitance associated with one or more conductive threads 308.

Although not illustrated, sensing lines such as conductive threads 308 may be implemented as a grid of sensing lines. For example, when configured as a self-capacitance sensor, sensing circuitry 126 can charge crossing conductive threads 308 (e.g., horizontal and vertical conductive threads) by applying a control signal (e.g., a sine signal) to each conductive thread 308. When an object, such as the user's finger, touches or comes in proximity to the parallel arrangement or grid of conductive thread 308, the conductive threads 202 that are touched are grounded, which changes the capacitance (e.g., increases or decreases the capacitance) on the touched conductive threads 308.

Sensing circuitry 126 uses the change in capacitance to identify the presence of the object. If a grid of conductive threads is used, sensing circuitry 126 detects a position of the touch-input by detecting which horizontal conductive thread 308 is touched, and which vertical conductive thread 308 is touched by detecting changes in capacitance of each respective conductive thread 308. Sensing circuitry 126 uses the intersection of the crossing conductive threads 308 that are touched to determine the position of the touch-input on the grid of conductive threads 308. For example, sensing circuitry 126 can determine touch data by determining the position of each touch as X,Y coordinates on the grid of conductive thread 308.

When implemented as a self-capacitance sensor, "ghosting" may occur when multi-touch-input is received. Consider, for example, that a user touches a grid of conductive thread 308 with two fingers. When this occurs, sensing circuitry 126 determines X and Y coordinates for each of the two touches. However, sensing circuitry 126 may be unable to determine how to match each X coordinate to its corresponding Y coordinate. For example, if a first touch and the second touch have different coordinates, sensing circuitry 126 may also detect "ghost" coordinates.

In one or more implementations, sensing circuitry 126 is configured to detect "areas" of touch-input corresponding to two or more touch-input points on the grid of conductive thread 308. Conductive threads 308 may be weaved closely together such that when an object touches the grid of conductive thread 308, the capacitance will be changed for multiple horizontal conductive threads 308 and/or multiple vertical conductive threads 308. For example, a single touch with a single finger may generate the coordinates. Sensing circuitry 126 may be configured to detect touch-input if the capacitance is changed for multiple horizontal conductive threads 308 and/or multiple vertical conductive threads 308. Note that this removes the effect of ghosting because sensing circuitry 126 will not detect touch-input if two single-point touches are detected which are spaced apart.

Alternately, when implemented as a projective capacitance sensor, sensing circuitry 126 charges a single set of conductive threads 308 (e.g., horizontal conductive threads 308) by applying a control signal (e.g., a sine signal) to the single set of conductive threads 308. Then, sensing circuitry 126 senses changes in capacitance in the other set of conductive threads 308 (e.g., vertical conductive threads 308).

In this implementation, vertical conductive threads 308 are not charged and thus act as a virtual ground. However, when horizontal conductive threads 308 are charged, the horizontal conductive threads capacitively couple to vertical conductive threads 308. Thus, when an object, such as the user's finger, touches the grid of conductive thread 308, the capacitance changes on the vertical conductive threads (e.g., increases or decreases). Sensing circuitry 126 uses the change in capacitance on vertical conductive threads 202 to identify the presence of the object. To do so, sensing circuitry 126 detects a position of the touch-input by scanning vertical conductive threads 308 to detect changes in capacitance. Sensing circuitry 126 determines the position of the touch-input as the intersection point between the vertical conductive thread 308 with the changed capacitance, and the horizontal conductive thread 308 on which the control signal was transmitted. For example, sensing circuitry 126 can determine touch data by determining the position of each touch as X,Y coordinates on the grid of conductive thread 308.

Whether implemented as a self-capacitance sensor or a projective capacitance sensor, the conductive thread 308 and sensing circuitry 126 is configured to communicate the touch data that is representative of the detected touch-input to removable electronics module 150, which is removably coupled to interactive object 104 via communication interface 162. The microprocessor 152 may then cause communication of the touch data, via network interface 156, to computing device 106 to enable the device to determine gestures based on the touch data, which can be used to control object 104, computing device 106, or applications implemented at computing device 106. In some implementations, a gesture may be determined by the internal electronics module and/or the removable electronics module and data indicative of the gesture can be communicated to a computing device 106 to control object 104, computing device 106, or applications implemented at computing device 106.

The computing device 106 can be implemented to recognize a variety of different types of gestures, such as touches, taps, swipes, holds, and covers made to touch sensor 102. To recognize the various different types of gestures, the computing device can be configured to determine a duration of the touch, swipe, or hold (e.g., one second or two seconds), a number of the touches, swipes, or holds (e.g., a single tap, a double tap, or a triple tap), a number of fingers of the touch, swipe, or hold (e.g., a one finger-touch or swipe, a two-finger touch or swipe, or a three-finger touch or swipe), a frequency of the touch, and a dynamic direction of a touch or swipe (e.g., up, down, left, right). With regards to holds, the computing device 106 can also determine an area of the grid of conductive thread 308 that is being held (e.g., top, bottom, left, right, or top and bottom. Thus, the computing device 106 can recognize a variety of different types of holds, such as a cover, a cover and hold, a five finger hold, a five finger cover and hold, a three finger pinch and hold, and so forth.

Figure 12:
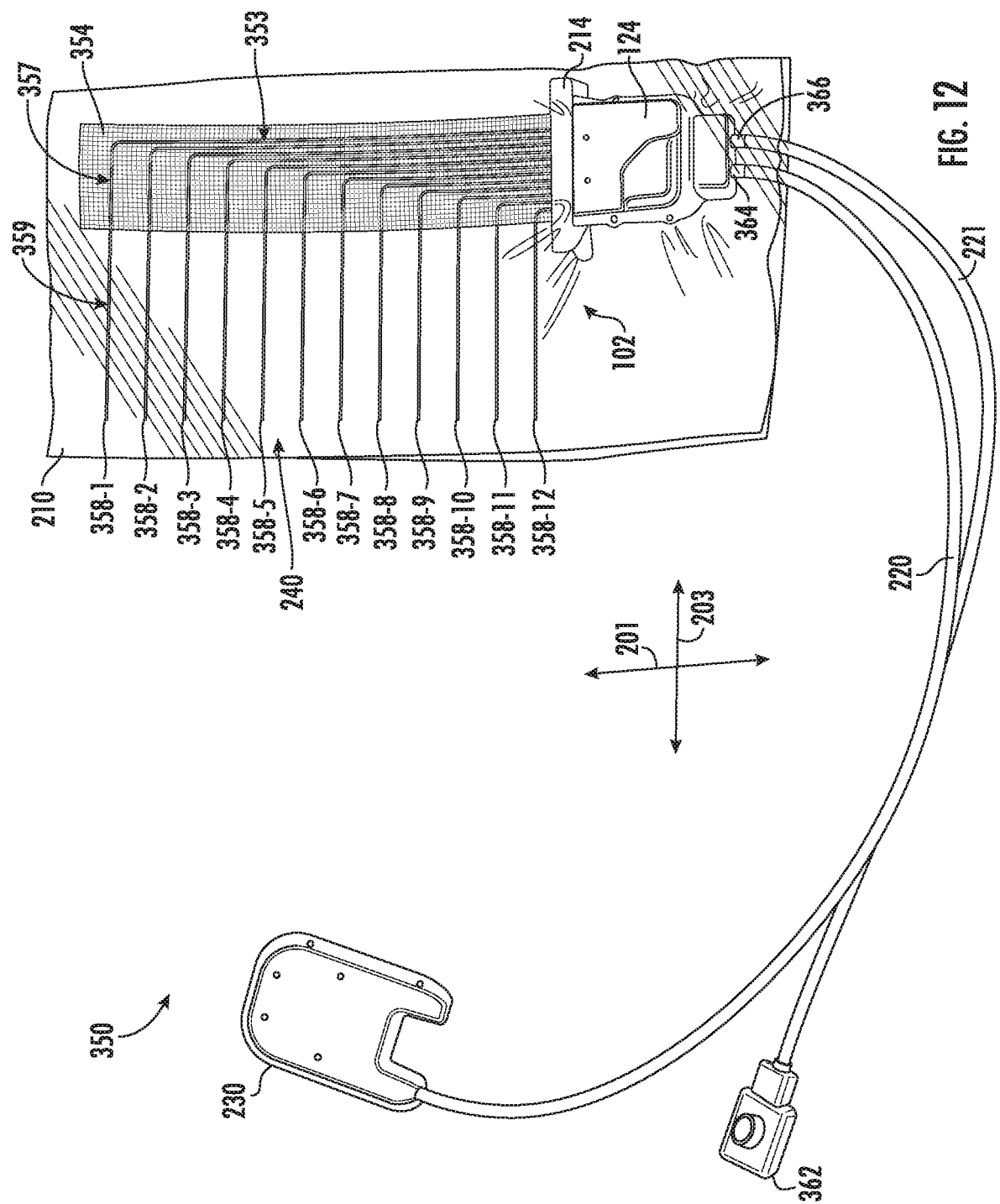
FIG. 12 is a front perspective view depicting another example of a pre-fabricated sensor assembly including conductive threads implemented as a set of conductive lines for a capacitive touch sensor in accordance with example embodiments of the present disclosure.

FIG. 12 illustrates an example of a pre-fabricated sensor assembly 350 in accordance with example embodiments of the present disclosure. FIG. 12 is a top view of sensor assembly 350 depicting a touch sensor 102, internal electronics module 124, receptacle 230, communication cable 220, and communication cable 221. FIG. 12 depicts another example where the sensing lines are formed from a plurality of conductive threads 358-1 through 358-12. Similar to the example depicted in FIG. 11, the plurality of conductive threads 358 are woven or otherwise integrated with one or more nonconductive threads or another flexible material to form a flexible substrate 354. Touch sensor 102 can be configured as a capacitive touch sensor or resistive touch sensor in example embodiments.

More particularly, in this example each conductive thread 358 includes a longitudinal section 353 that extends in a longitudinal direction from ribbon 214. In some examples, the longitudinal section 353 may be integrated with the flexible substrate 354 such as by weaving the longitudinal section 353 with the one or more nonconductive threads to form the flexible substrate 354. Each conductive thread also includes a curved section 355 that attaches the longitudinal extent to a first lateral section 357. In some embodiments, the first lateral section 357 can also be integrated with the flexible substrate, such as by weaving, embroidering, etc. In other examples, the first lateral section 357 or a portion thereof may be loose from the flexible substrate 354 such that it is movable relative to the flexible substrate. Each conductive thread includes a second lateral section 359 that extends beyond the outer perimeter of the flexible substrate 354. Collectively, the second lateral section 359 of the plurality of conductive threads forms a touch-sensitive area 361 for touch sensor 102.

One or more flexible retaining layers 210 can be used to form a housing for touch sensor 102 and internal electronics module 124. By way of example, a vacuum sealing, heat sealing, and/or another technique can be used such that the second lateral section 359 of each of the conductive threads is formed within the sensor assembly at a predefined location and spacing relative to the other conductive threads. The one or more flexible retaining layers can facilitate such positioning and spacing of the conductive threads while allowing the conductive threads to extend beyond the outer perimeter of the flexible substrate on which they are at least partially formed.

Similar to the sensor assembly 200, the conductive threads may be spaced from one another by a variable distance to facilitate a compact arrangement while also providing a suitable space for the capacitive touch sensor. As illustrated in FIG. 12, for example, the longitudinal section 353 of each conductive thread is spaced from an adjacent longitudinal section 353 of another conductive thread by a distance that is less than a distance between the lateral section 359 of each conductive thread. In this manner, a tight spacing or pitch between the longitudinal sections can be utilized to facilitate connection to the internal electronics module 124 at a smaller pitch or spacing between threads than is used at the touch-sensitive area 240. At the touch-sensitive area 240, the distance between the lateral sections can be made greater to facilitate a capacitive touch sensor that is suitably receptive to touch input.

Internal electronics module 124 includes a plurality of ports including a first port 364 and a second port 366. The first port 364 is coupled to a first end portion of communication cable 220. Communication cable 220 includes a second end portion that is coupled to a receptacle 230. The second port 366 is coupled to a first end portion of a communication cable 221. The second end portion of communication cable 221 is coupled to a visual output device 362. Visual output device 362 can include one or more LEDs for providing a visual output response to touch input received at the capacitive touch sensor, as well as to input from one or more computing devices 106. In other examples, communication cable 221 may be coupled to other types of input and/or output devices, such as audio output devices (e.g., speakers) and/or haptic output devices (e.g., haptic motors). Object 104 may also include one or more output devices configured to provide a haptic response, a tactical response, an audio response, a visual response, or some combination thereof. A communication cable may attach or otherwise coupled to output devices such as one or more output devices configured to provide a haptic response, tactical response, audio response, a visual response, or some combination thereof. Output devices may include visual output devices, such as one or more light-emitting diodes (LEDs), audio output devices such as one or more speakers, one or more tactile output devices, and/or one or more haptic output devices.

Figure 13:
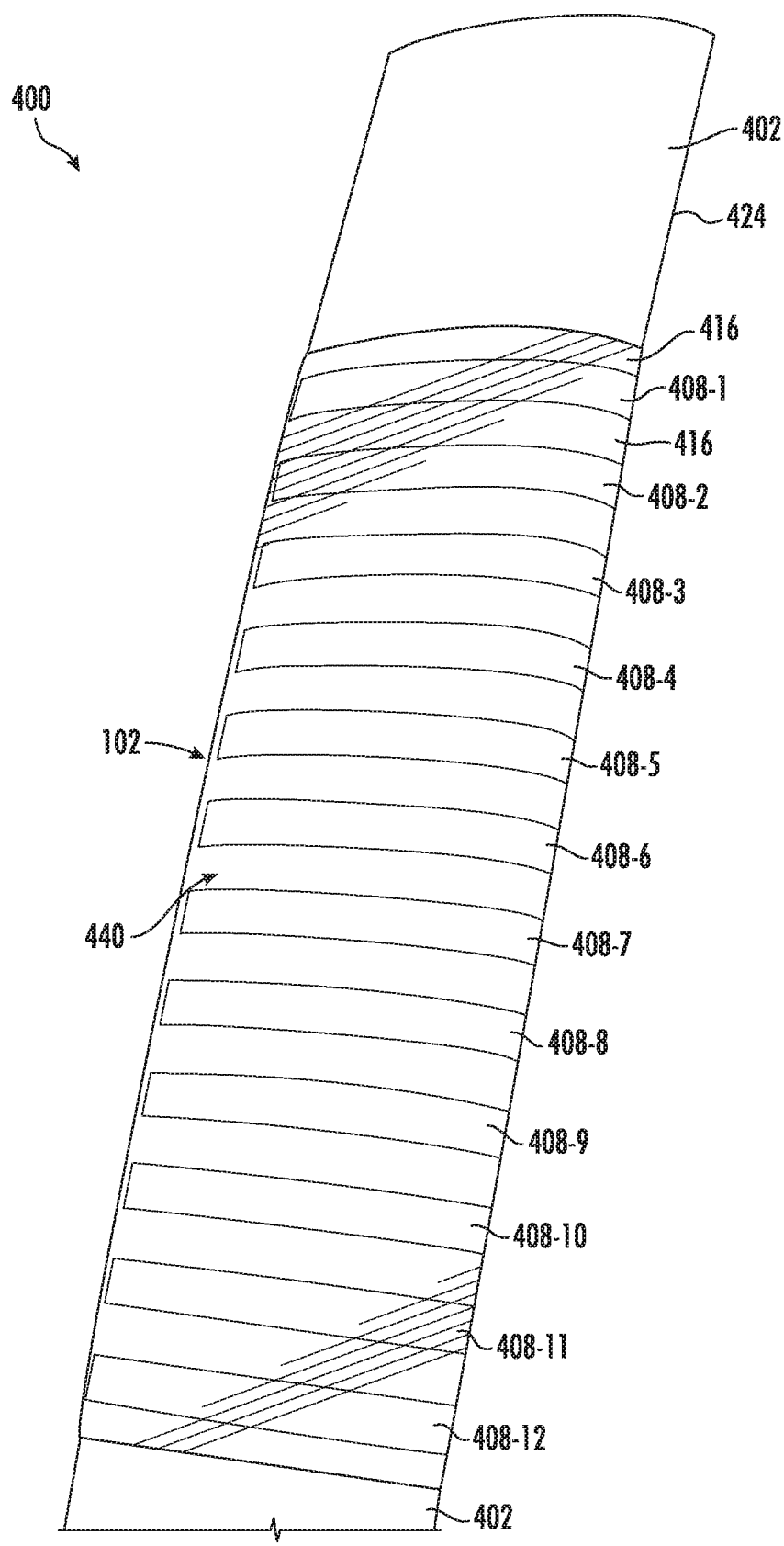
FIG. 13 is a front perspective view depicting an example of a pre-fabricated sensor assembly attached to a strap of an interactive garment accessory in accordance with example embodiments of the present disclosure.
Figure 14:
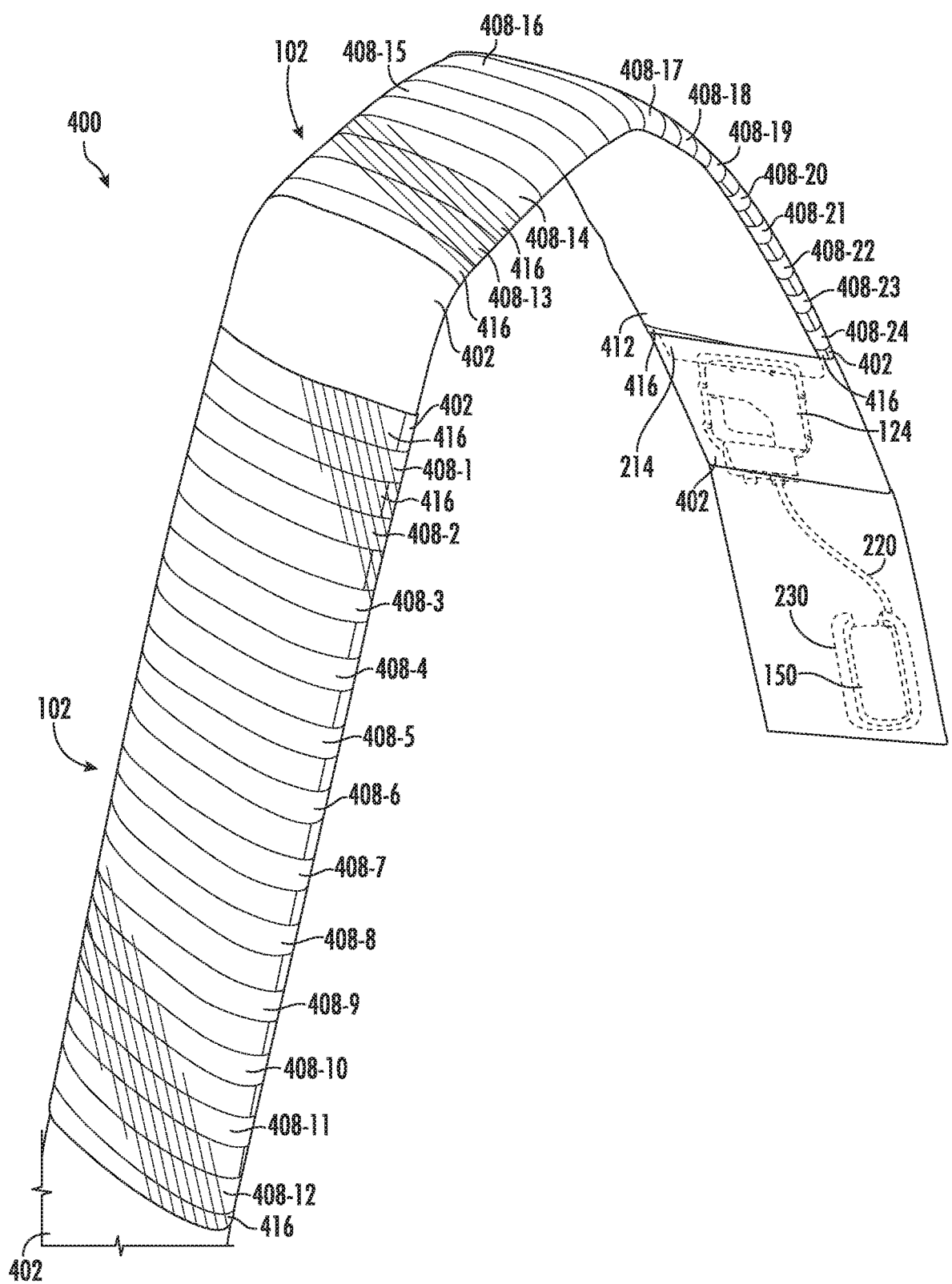
FIG. 14 is a side perspective view depicting the example pre-fabricated sensor assembly and interactive garment accessory depicted in FIG. 13 in accordance with example embodiments of the present disclosure.

FIGS. 13 and 14 illustrate an example of an interactive object 400 in accordance with example embodiments of the disclosed technology. In this example, interactive object 400 is depicted as strap or other flexible member. By way of example, interactive object 400 may include a strap of a backpack, satchel, purse, bag, or other object. In this manner, interactive object 400 may comprise an object suitable for its primary purpose and that is intended for attachment to another object to form a final product. FIG. 13 is a front perspective view of a portion of an example interactive object in which a pre-fabricated sensor assembly in accordance with example embodiments is integrated. FIG. 14 is a side perspective view of the example interactive object in which a pre-fabricated sensor assembly in accordance with example embodiments is integrated.

A pre-fabricated sensor assembly can be attached to the pre-fabricated strap substrate which can be formed of one or more flexible object substrates. By way of example, a strap can be formed from a flexible foam material, a flexible woven or non-woven fabric, or other flexible material. In some examples, strap can be formed from one or more rigid materials. A touch sensor 102 of the pre-fabricated sensor assembly includes a plurality of sensing lines 408-1 through 408-24. Each of the sensing lines may include a multilayer conductive line structure as earlier described. In other examples, each of the sensing lines may include a conductive thread. Touch sensor 102 can be configured as a capacitive touch sensor or resistive touch sensor in example embodiments.

In the particularly described example, the plurality of conductive lines are formed along the first surface of object substrate 402. The plurality of conductive lines may also extend long the rear surface of the object substrate 402. In some examples, one or more shield layers 412 may be applied over plurality of sensing lines at the rear surface of the objects substrate. One or more adhesive layers 416 may be used to attach the plurality of sensing lines to the object substrate. The one or more adhesive layers may be formed over the plurality of sensing lines or under the plurality of sensing lines. In other examples, a glue, heat, or other techniques may be used to attach the plurality of sensing lines to the object substrate. In some examples, the substrate may be folded to encapsulate plurality of sensing lines such that the rear surface of the plurality of sensing lines will be separated from the user other object that may come in contact with the strap.

FIG. 14 illustrates that the plurality of sensing lines may be divided into sections with a space therebetween. For example, sensing lines 408-1 through 408-12 may form a first touch-sensitive area while the sensing lines 408-13 through 408-24 may form a second touch-sensitive area. In some examples, sensing lines 408-1 through 408-12 may form a first capacitive touch sensor in the sensing lines 408-13 through 408-24 may form a second capacitive touch sensor.

Figure 15:
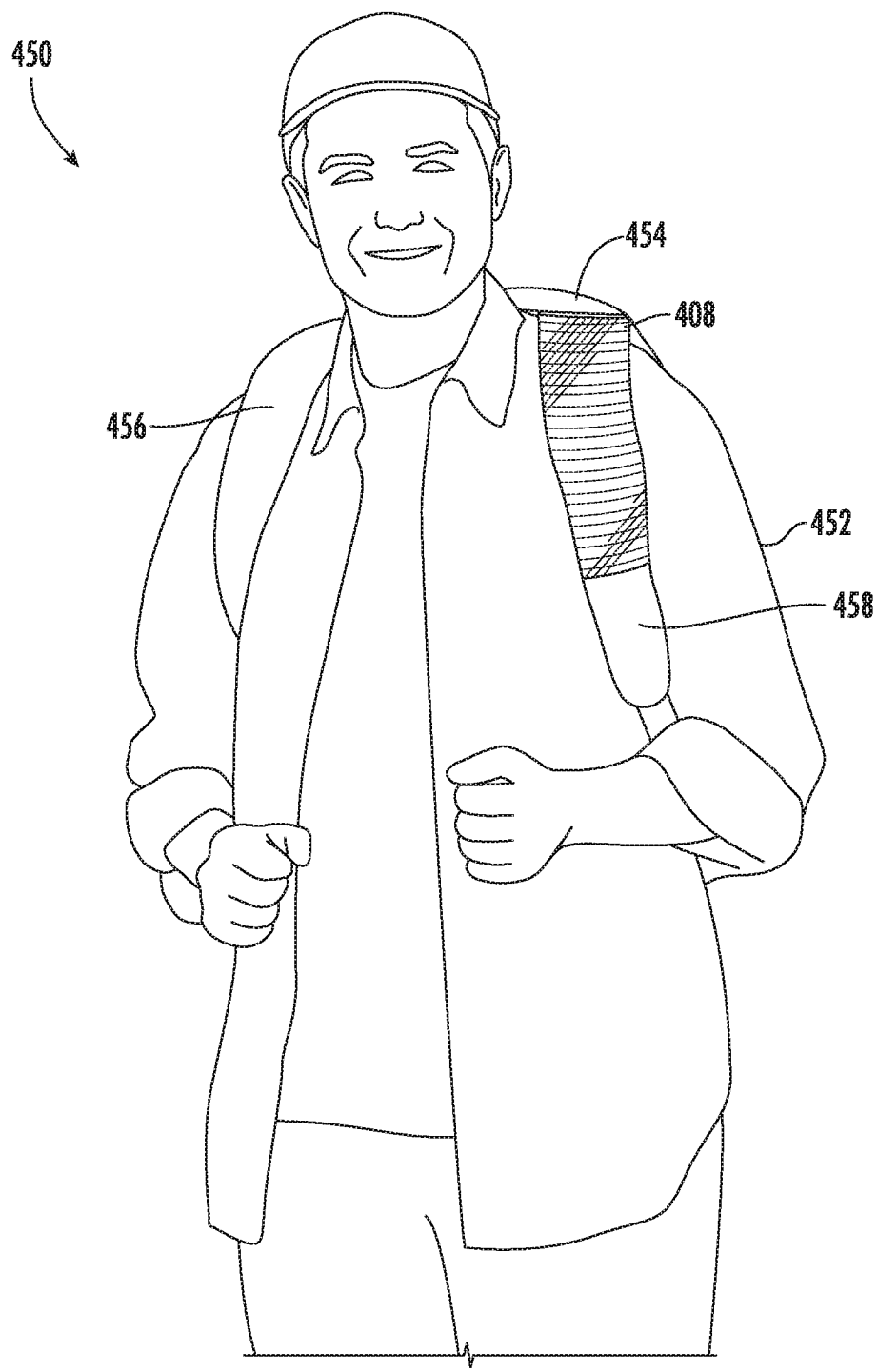
FIG. 15 is an illustration of a person wearing an interactive backpack including a pre-fabricated sensor assembly in accordance with example embodiments of the present disclosure.

FIG. 15 illustrates a user 452, wearing an interactive backpack 454 comprising a strap 456 and a strap 458. Strap 458 incorporates a pre-fabricated sensor assembly in accordance with example embodiments has been integrated. In the particularly described example, the plurality of sensing lines 408 of a capacitive touch sensor are formed on a strap as earlier described.

Although FIG. 15 depicts the plurality of sensing lines 408 that are visible, the plurality of sensing lines may be hidden in other examples. For instance, one or more layers may be formed over the plurality of sensing lines such that the plurality of sensing lines are hidden from view.

In accordance with some implementations, a a receptacle 230 (not shown) can be coupled to the touch sensor 102 that is integrated within a strap or other portion of an interacted object as shown in FIGS. 13-15. By way of example, a receptacle 230 can be integrated in a portion of the backpack such as within an interior portion of the backpack. In another example, receptacle 230 can be integrated within a rear portion of the strap for example. Touch sensor 102 can be configured as a capacitive touch sensor or resistive touch sensor in example embodiments.

Figure 16:
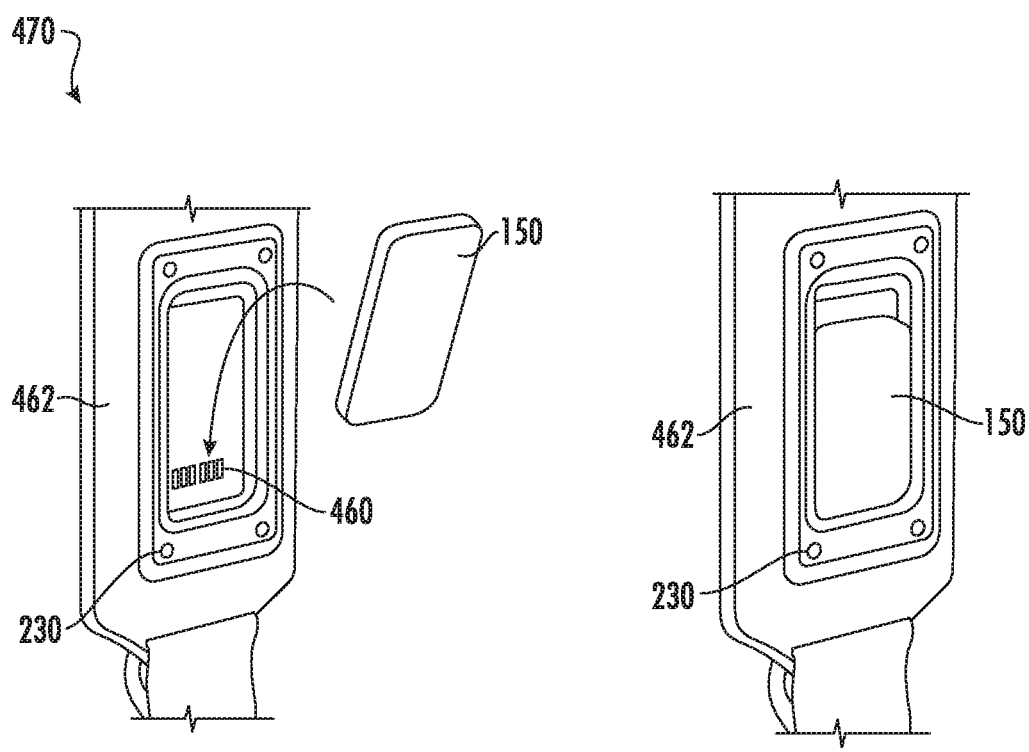
FIG. 16 depicts a receptacle of a pre-fabricated sensor assembly and illustrates a removable electronics module being physically coupled to an interactive object via the receptacle including in accordance with example embodiments of the present disclosure.

FIG. 16 illustrates an example receptacle 230 of a pre-fabricated sensor assembly 470 in accordance with example embodiments. In the example depicted in FIG. 16, receptacle 230 is integrated within a rear portion of the strap 462 of an interactive object such as an interactive garment, interactive garment container, or interactive garment accessory.

In some examples, a portion of the object substrate or other portion of the interactive object can be molded to secure the receptacle in the interactive object. In other examples, receptacle 230 can be glued, bonded, or otherwise coupled to an object substrate of the interactive object.

FIG. 16 illustrates that a removable electronics module 150 may be removably connected to the receptacle by inserting the removable electronic module into the receptacle. Receptacle 230 may include one or more electrical contacts 460 configured to provide electrical communication between the removable electronics module 150 and the pre-fabricated sensor assembly.

Figure 17:
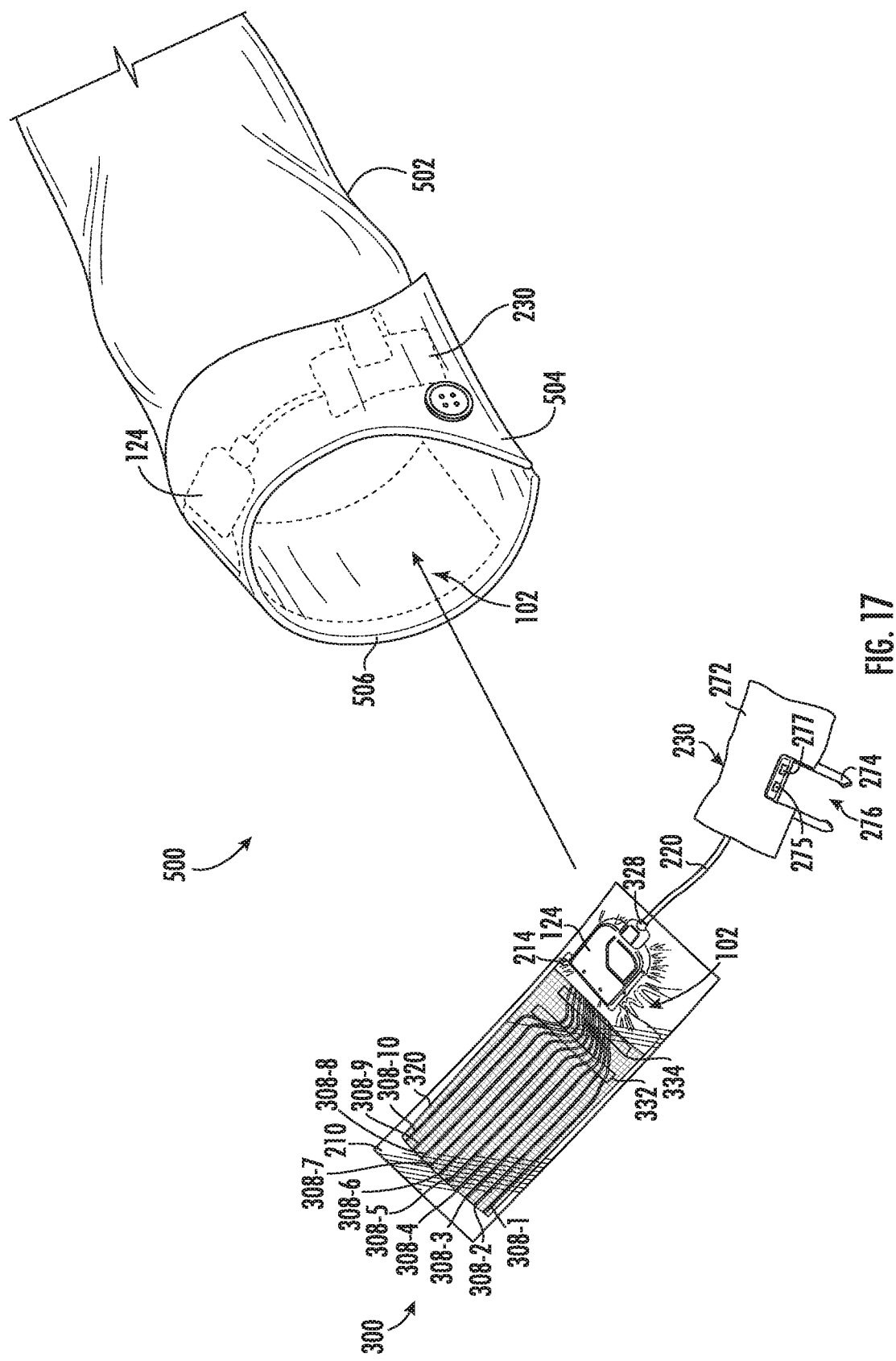
FIG. 17 is an illustration of an interactive garment depicting the insertion of a pre-fabricated sensor assembly into the interactive garment in accordance with example embodiments of the present disclosure.

FIG. 17 illustrates an example of an interactive object such as an interactive garment including a sleeve 502 in which a pre-fabricated sensor assembly 300 in accordance with one or more embodiments is being attached. FIG. 17 illustrates an example of attaching a pre-fabricated sensor assembly to an at least partially preformed object in accordance with example embodiments. FIG. 17 depicts an example including an interactive garment, having a sleeve 502 in which pre-fabricated sensor assembly 300 is to be integrated. It is noted that the use of pre-fabricated sensor assembly 300 is provided by way of example only. Any of the pre-fabricated sensor assemblies as described herein may be used.

In some examples, pre-fabricated sensor assembly 300 can be applied to the inside portion of the cuff 504. For example, pre-fabricated sensor assembly 300 can be positioned such that the plurality of sensing lines are adjacent to the inside surface of the textile substrate that forms the interactive object. In some examples, a shield layer may be utilized to inhibit touch inputs between the user's arm or other portion that may be on the inside surface of the sleeve. In some examples, a heat pressing or other thermal application may be applied to connect the one or more retaining layers to the textile substrate. In other examples, other fastening techniques such as gluing, sewing, bonding, or other techniques may be used.

Prefabricated sensor assembly 300 can be inserted in an opening. The cuff 504 of the interactive object can include an opening 506. The opening 506 in the cuff is one example of a receiving feature of an interactive object. The pre-fabricated sensor assembly 300 can be inserted in the opening 500. After inserting the pre-fabricated sensor assembly, one or more processes can be used to attach the pre-fabricated sensor assembly to the textile substrate. After attaching the pre-fabricated sensor assembly, opening 506 may be close by sewing or another technique. It is noted however, that the pre-fabricated sensor simply can be inserted directly within the cuff without utilizing an opening in some examples. The plurality of sensing lines can extend circumferentially around at least a portion of the cuff. In this manner, a user wearing the interactive jacket can provide swipe or other motions in a direction along the direction of the sleeve to provide swipe gestures and other gestures using the interactive garment. It is noted that other arrangements of the plurality of sensing lines may be used.

Figure 18:
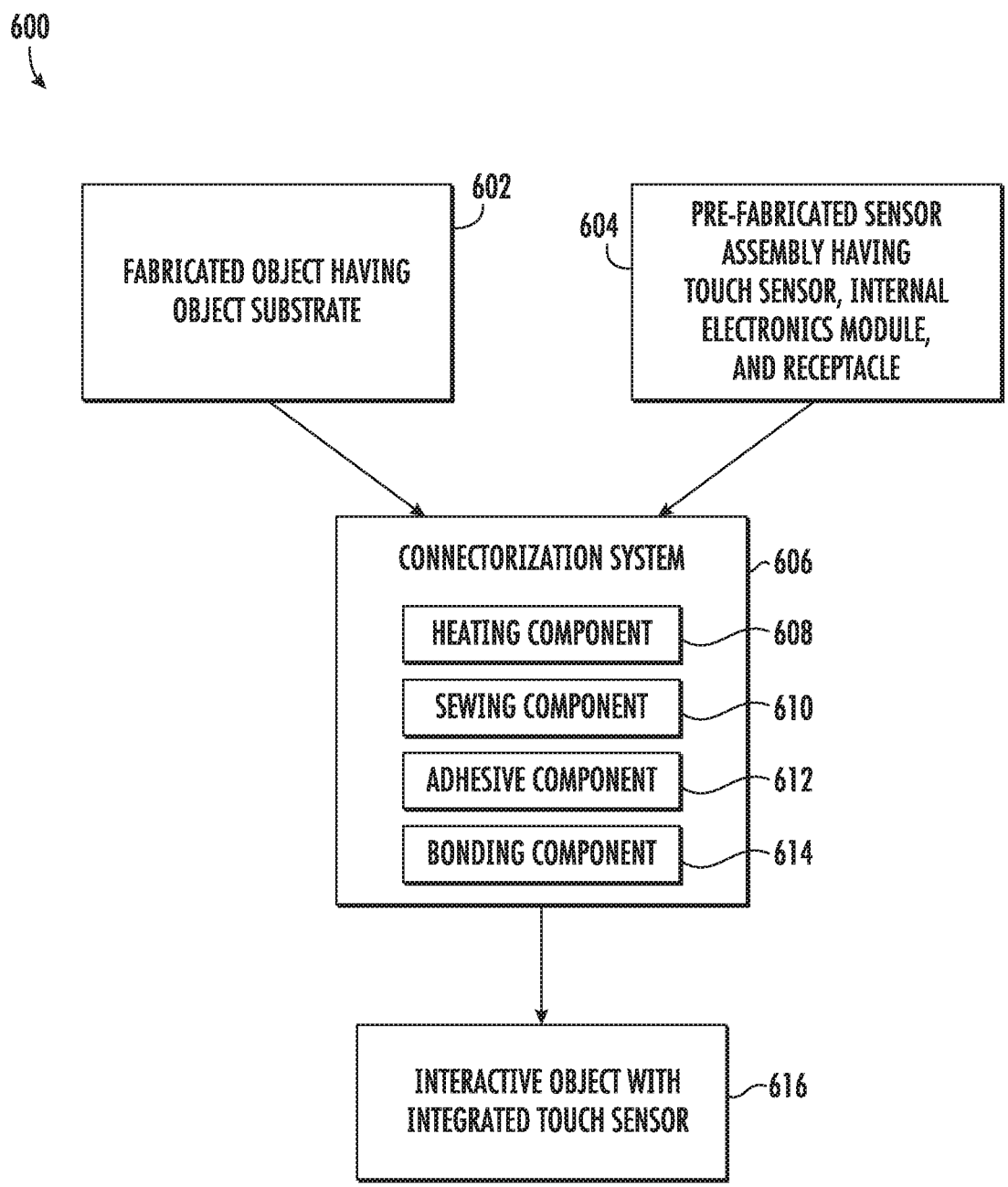
FIG. 18 depicts a block diagram illustrating an example process of manufacturing an interactive object using a pre-fabricated sensor assembly in accordance with example embodiments of the present disclosure.

FIG. 18 is a block diagram depicting a manufacturing process 600 that can be utilized in accordance with example embodiments of the present disclosure. A pre-fabricated sensor assembly can be applied to a object substrate is been at least partially formed into an object.

At 602, process 600 includes providing a fabricated object having an object substrate. The fabricated object can be a manufactured object comprising an object substrate. The manufactured object can be received by a connectorization system. The manufactured object can be in a form suitable for its primary purpose. For example, the manufacturer object can be a garment that is suitable to be worn or garment accessory that is suitable to be used. As a specific example, one or more seams in a garment can be left open such that a prefabricated sensor assembly can be inserted within the opening. In this manner, the manufactured object can include receiving feature. The receiving feature can be an opening or other mechanism whereby a prefabricated sensor assembly can be inserted. Numerous types of receiving features can be used. At 604, process 600 can include providing a pre-fabricated sensor assembly. The pre-fabricated sensor assembly can have a touch sensor (e.g., capacitive or resistive), an internal electronics module, and a receptacle in example embodiments. The prefabricated sensor assembly can include a communication interface having a first in portion coupled to a first electronics module and a second and portion coupled to a receptacle configured to removably connect a second electronics module to the prefabricated sensor assembly. The touch sensor can include a plurality of flexible sensing elements such as flexible sensing lines elongated in a first direction coupled to the first electronics module. The first electronics module can be powered by a power source of the second electronics module when the second electronics module is connected to the prefabricated sensor assembly. The fabricated object and the pre-fabricated sensor assembly can be provided to a connectorization system 606.

Connectorization system 606 can include a heating component 608, a sewing component 610, an adhesive component 612, a bonding component 614, and/or other components that can be utilized to connect pre-fabricated sensor assembly to the fabricated object having an object substrate.

The connectorization system 606 can be used to create an interactive object having an integrated capacitive touch sensor shown at 616. In some examples, a first connectorization component can be utilized to attach one portion of the pre-fabricated sensor assembly to an interactive object in a second connector relation component can utilize to connect the second portion of the pre-fabricated sensor assemblies to the interactive object. By way of example, one or more flexible retaining layers such as one or more encapsulation films can be heat pressed to attach a capacitive touch sensor portion of a capacitive sensor assembly to an interactive object. In another example a sewing component or other bonding component can be utilized to attach the capacitive touch sensor to the interactive object.

A second connectorization component can be utilized to attach a second portion of the pre-fabricated sensor assembly to the interactive object. For example, after using a heating component 608 to attach one or more retaining layers housing a capacitive touch sensor, sewing component 610 can be utilized to attach a receptacle 230 to the interactive object. Other examples and combinations can be used.

In accordance with example embodiments, a pre-fabricated sensor assembly for an interactive object including an object substrate can be provided. The pre-fabricated sensor assembly can include a capacitive touch sensor that includes a plurality of flexible sensing lines elongated in at least a first direction. The pre-fabricated sensor assembly can include a first electronics module comprising sensing circuitry in electrical communication with the plurality of flexible sensing lines. The pre-fabricated sensor assembly can include a communication interface comprising a first end portion coupled to the first electronics module and comprising a second end portion. The pre-fabricated sensor assembly can include a receptacle coupled to the second end portion of the communication interface. The receptacle can include one or more electrical contacts for electrically coupling to a second electronics module. The receptacle can be configured to removably connect the second electronics module to the pre-fabricated sensor assembly. The pre-fabricated sensor assembly can include one or more flexible retaining layers that define a housing for a first portion of the pre-fabricated sensor assembly. The first portion of the pre-fabricated sensor assembly can include at least a portion of each of the plurality of flexible sensing lines.

Figure 19:
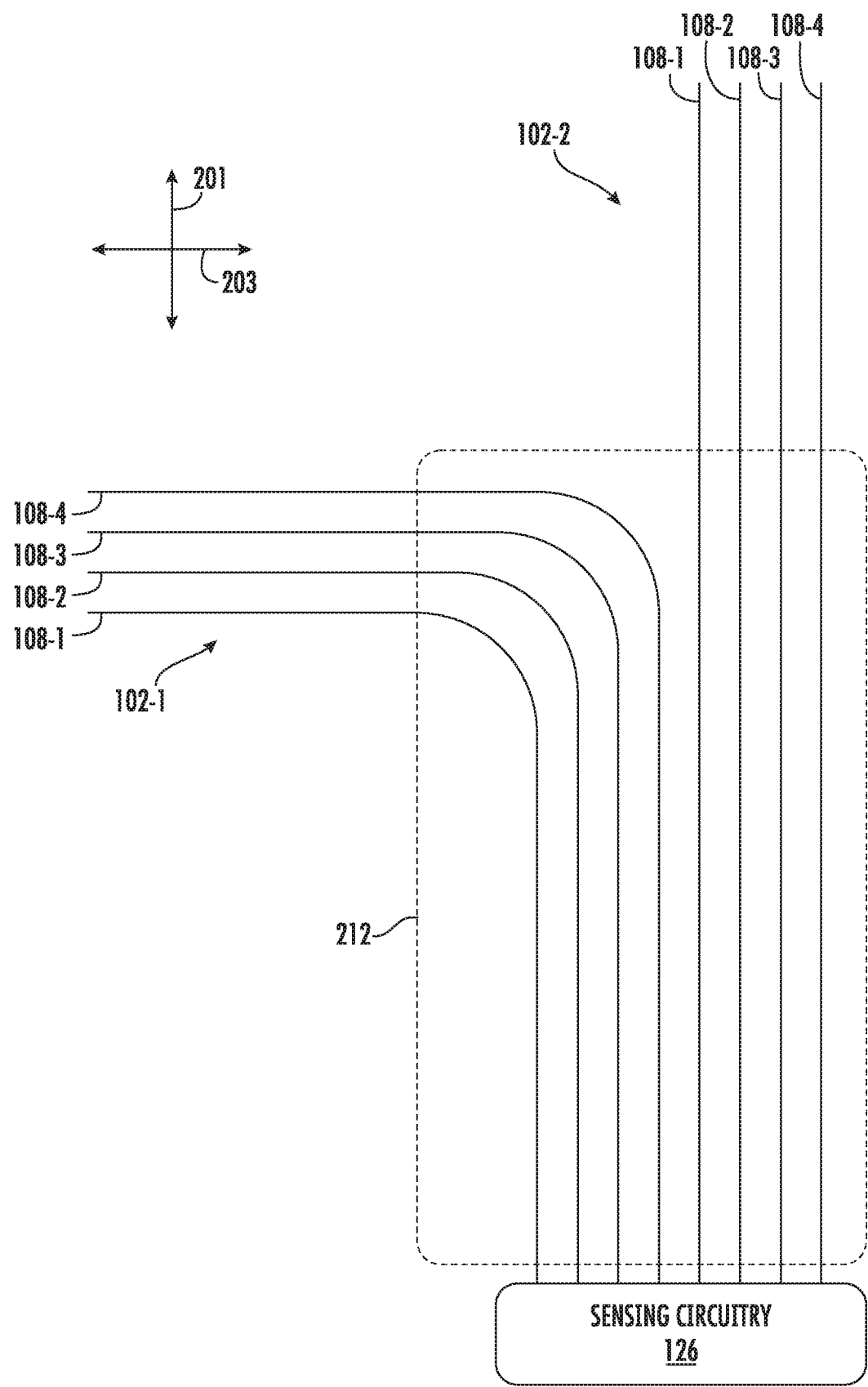
FIG. 19 is a top view depicting another example of a pre-fabricated sensor assembly including a set of conductive lines for a capacitive touch sensor in accordance with example embodiments of the present disclosure.

FIG. 19 illustrates an example of a sensor assembly including a plurality of touch sensors formed from a single set of conductive sensing lines coupled to an internal electronics module including sensing circuitry 126. A set of sensing lines 108-1 through 108-8 can be provided as previously described. Although eight sensing lines are illustrated, any number of sensing lines can be used in embodiment of FIG. 19 or any of the other embodiments described herein. The set of sensing lines can be a set of conductive lines formed from a multilayered film, a set of conductive threads, or any other suitable conductive line.

One or more shield layers 212 overlie a first portion of each of the plurality of sensing lines 108-1 through 108-8. In this example, a lateral portion of sensing lines 108-1 through 108-4 is left uncovered by the one or more shield layers 212. A longitudinal portion of sensing lines 108-5 through 108-8 is left uncovered by the one or more shield layers 212. The uncovered portion of sensing lines 108-1 through 108-4 from a first touch sensor 102-1 at a first area of the interactive object or pre-fabricated sensor assembly. The first touch sensor includes a first subset of the set of sensing lines. Each flexible sensing line of the first subset can include a first section that is elongated in a first direction (a direction parallel to longitudinal axis 201) and a second section that is elongated in a second direction (e.g., a direction parallel to lateral axis 203). The first touch sensor 102-1, including uncovered sensing lines extending in the direction of lateral axis 203, may be suitable to receive touch inputs such as gestures including swipes having a motion component in a direction parallel to the longitudinal axis 201. The first touch sensor 102-1 can be configured as a capacitive touch sensor or resistive touch sensor in example embodiments.

The uncovered portions of sensing lines 108-5 through 108-8 form a second touch sensor 102-2 at a second area of the interactive object or prefabricated sensor assembly. The second touch sensor can include a second subset of the set of sensing lines. Each sensing line of the second subset can include a first section that is elongated in the first direction and can include a second section elongated in the first direction or another direction. The second touch sensor 102-2, including uncovered sensing lines extending in the direction of longitudinal axis 201, may be suitable to receive touch inputs such as gestures including swipes having a motion component in a direction parallel to the lateral axis 203. Other layouts, gestures, and arrangements may be used. The second touch sensor 102-2 can be configured as a capacitive touch sensor or resistive touch sensor in example embodiments.

The shield layer(s) 212 can overlie the first section of each sensing line of the first subset of sensing lines in some examples. The shield layer(s) 212 can optionally overlie the first section of each sensing line of the second subset of something line in some examples.

Shield layer(s) 212 may not overlie the first section of each flexible sensing line of the second subset of the plurality of flexible sensing lines in some examples.

The second section of each flexible sensing line of the first subset of the plurality of flexible sensing lines forms a touch-sensitive area of the first capacitive touch sensor. The second section of each flexible sensing of the second subset of the plurality of flexible sensing lines can form a touch-sensitive area of the second capacitive touch sensor. Each sensing line of the plurality of flexible sensing lines can include a conductive thread in some examples. At least a portion of each conductive thread can be attached to a textile-based substrate.

In FIG. 19, the second section of each flexible sensing line of the second subset of the plurality of flexible sensing lines is elongated in the first direction parallel to longitudinal axis 201. In other examples, the second section of each flexible sensing line of the second subset of the plurality of flexible sensing lines is elongated in the first direction parallel to lateral axis 203.

Figure 20:
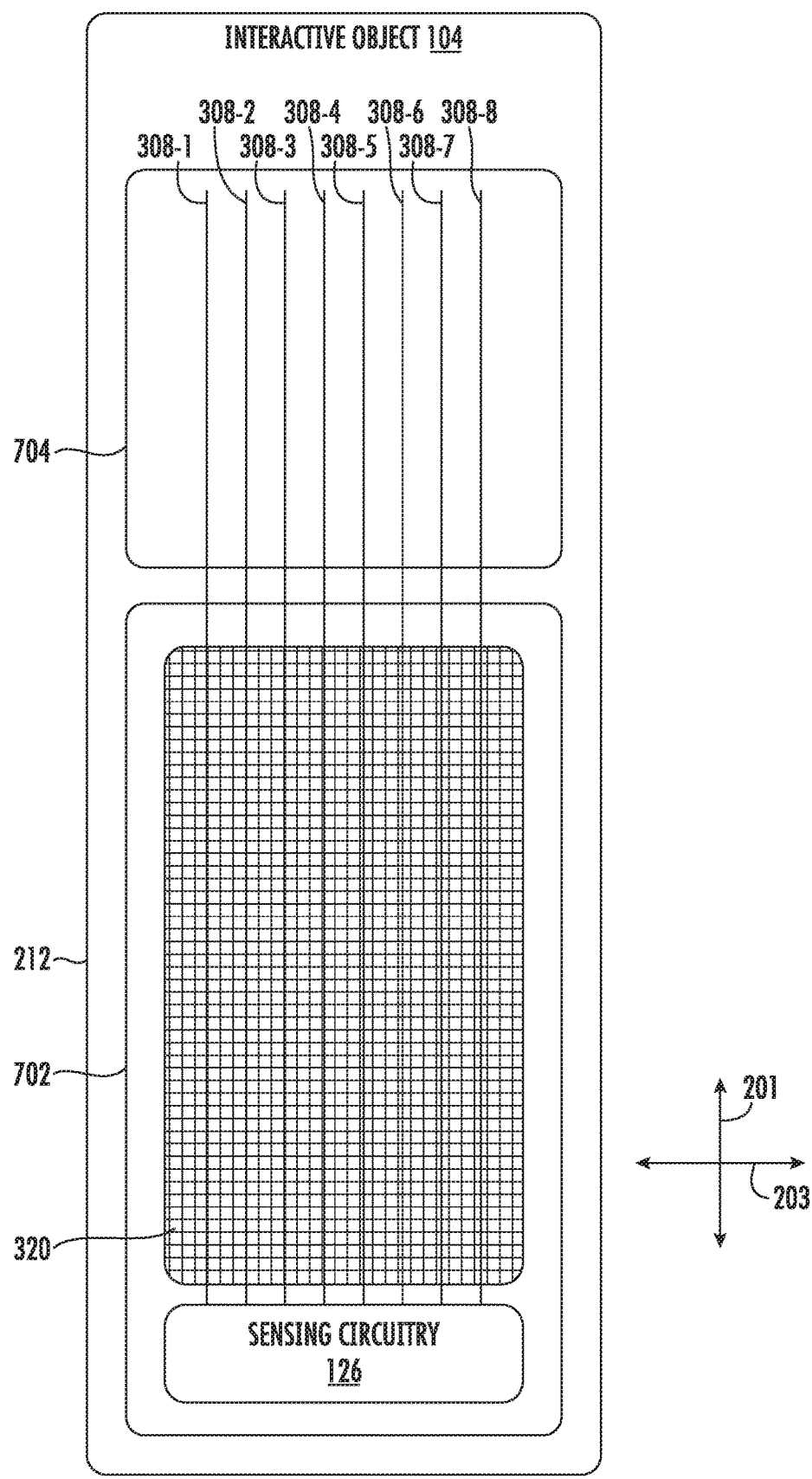
FIG. 20 is a top view depicting another example of a pre-fabricated sensor assembly including a set of conductive lines for a capacitive touch sensor in accordance with example embodiments of the present disclosure.

FIG. 20 illustrates an example of a prefabricated sensor assembly 702 including a touch sensor having a set of sensing lines where a first section of each sensing line is coupled to an assembly substrate of the prefabricated sensor assembly and the second section of each sensing line is coupled to a substrate of an interactive object to which the prefabricated sensor assembly is attached. For example, the second section of each sensing line can be attached to a textile or other substrate.

A set of conductive threads 308-1 through 308-8 can be provided as previously described. In other examples, other types of sensing lines may be used. The set of sensing lines can be a set of conductive lines formed from a multilayered film, a set of conductive threads, or any other suitable conductive line. Although eight sensing lines are illustrated, any number of sensing lines can be used in the embodiment of FIG. 20.

In some examples, each conductive thread can include a first section and a second section. The first section of each conductive thread can be attached to a substrate (e.g., substrate 320) of the prefabricated sensor assembly such as a textile-based substrate. The second section of each conductive thread can initially be loose or otherwise hang from the textile-based substrate and can extend beyond an outer perimeter of the textile-based substrate. The first section of each conductive thread can be attached to the assembly substrate (e.g., substrate 320). In some examples, the first portion of each conductive thread can be woven with the textile-based substrate. The second section of each conductive thread can initially be loose or otherwise hang from the substrate and can extend beyond an outer perimeter of the substrate.

The second section can be attached to the object substrate 704 of the interactive object. For example, the second section can be attached the object substrate of an already manufactured object. In some examples the second section can be embroidered to the object substrate of the interactive object. Other examples of attaching the first portion of each conductive line to the substrate of the prefabricated sensor assembly using a first manufacturing process and/or connectorization component and attaching the second portion of each conductive line to the object substrate using a second manufacturing process and/or connectorization component can be used.

In some examples, each conductive thread can include a first section that extends in a first direction and a second portion that extends in a second direction. The first direction can be substantially orthogonal to the second direction.

Figure 21:
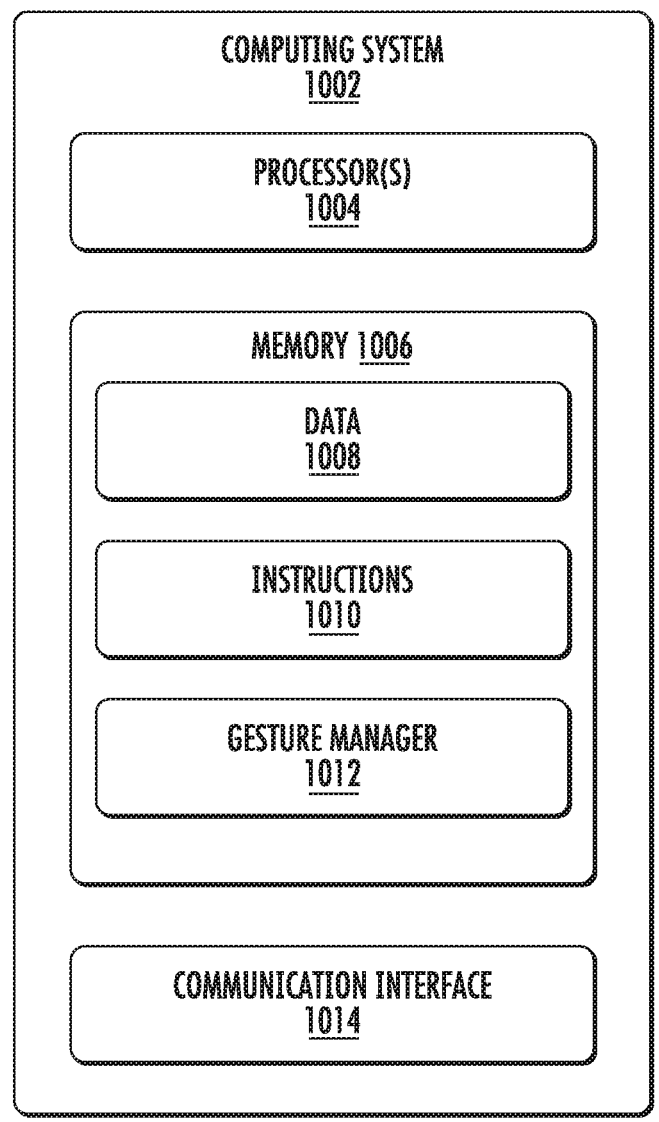
FIG. 21 illustrates various components of an example computing system that can be implemented as any type of client, server, and/or computing device as described herein.

FIG. 21 illustrates various components of an example computing system 1002 that can implement any type of client, server, and/or computing device described herein. In embodiments, computing system 1002 can be implemented as one or a combination of a wired and/or wireless wearable device, System-on-Chip (SoC), and/or as another type of device or portion thereof. Computing system 1002 may also be associated with a user (e.g., a person) and/or an entity that operates the device such that a device describes logical devices that include users, software, firmware, and/or a combination of devices.

Computing system 1002 includes a communication interface 1014 that enables wired and/or wireless communication of data 1008 (e.g., received data, data that is being received, data scheduled for broadcast, data packets of the data, etc.). Data 1008 can include configuration settings of the device, media content stored on the device, and/or information associated with a user of the device. Media content stored on computing system 1002 can include any type of audio, video, and/or image data. Computing system 1002 includes one or more data inputs via which any type of data, media content, and/or inputs can be received, such as human utterances, touch data generated by a touch sensor 102, user-selectable inputs (explicit or implicit), messages, music, television media content, recorded video content, and any other type of audio, video, and/or image data received from any content and/or data source.

Communication interfaces can be implemented as any one or more of a serial and/or parallel interface, a wireless interface, any type of network interface, a modem, and as any other type of communication interface. Communication interfaces provide a connection and/or communication links between computing system 1002 and a communication network by which other electronic, computing, and communication devices communicate data with computing system 1002.

Computing system 1002 includes one or more processors 1004 (e.g., any of microprocessors, controllers, and the like), which process various computer-executable instructions to control the operation of computing system 1002 and to enable techniques for, or in which can be embodied, interactive cord. Alternatively or in addition, computing system 1002 can be implemented with any one or combination of hardware, firmware, or fixed logic circuitry that is implemented in connection with processing and control circuits. Although not shown, computing system 1002 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1002 also includes memory 1006 which may include computer-readable media, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Memory 1006 may also include a mass storage media device of computing system 1002.

Computer-readable media provides data storage mechanisms to store device data, as well as computer-readable instructions 1010 which can implement various device applications and any other types of information and/or data related to operational aspects of computing system 1002. For example, an operating system can be maintained as a computer application with computer-readable media and executed on processors 1004. Device applications may include a device manager, such as any form of a control application, software application, signal-processing and control module, code that is native to a particular device, a hardware abstraction layer for a particular device, and so on.

Memory 1006 may also include a gesture manager 1012. Gesture manager 1012 is capable of interacting with applications and touch sensor 102 effective to activate various functionalities associated with computing device 106 and/or applications through touch-input (e.g., gestures) received by touch sensor 102. Gesture manager 1012 may be implemented at a computing device 106 that is local to object 120 or remote from object 120. Gesture manager 1012 is one example of a controller.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A pre-fabricated sensor assembly for an interactive object including an object substrate, the pre-fabricated sensor assembly comprising:
    a capacitive touch sensor comprising a plurality of flexible sensing lines that each include a first section that extends in a first direction at a first portion of the pre-fabricated sensor assembly and a second section that extends in a second direction at a second portion of the pre-fabricated sensor assembly, the capacitive touch sensor including an adhesive layer having a first surface coupled to the first section of each flexible sensing line and a second surface coupled to a shield layer such that the shield layer extends over at least the first section of each flexible sensing line to provide a ground for electrical fields at the first section of each flexible sensing line;
    a first electronics module comprising sensing circuitry in electrical communication with the plurality of flexible sensing lines;
    a communication interface comprising a first end portion coupled to the first electronics module and comprising a second end portion;
    a receptacle coupled to the second end portion of the communication interface, the receptacle configured to removably connect a second electronics module to the pre-fabricated sensor assembly; and
    one or more flexible retaining layers that define a housing for a first portion of the pre-fabricated sensor assembly, the first portion of the pre-fabricated sensor assembly including at least a portion of each of the plurality of flexible sensing lines;
    wherein the communication interface extends from within the housing of the one or more flexible retaining layers to outside of the one or more flexible retaining layers; and
    wherein the receptacle extends at least partially outside of the one or more flexible retaining layers to enable removable connection of the second electronics module.

2. The pre-fabricated sensor assembly of claim 1, wherein:
    the one or more flexible retaining layers at least partially surround the first electronics module and the plurality of flexible sensing lines of the capacitive touch sensor.

3. The pre-fabricated sensor assembly of claim 2, wherein:
    each flexible sensing line of the plurality of flexible sensing lines comprises a multilayered flexible film including at least a flexible base layer and a metal layer that overlies the flexible base layer.

4. The pre-fabricated sensor assembly of claim 3, wherein:
    the metal layer includes at least one of a copper layer, a silver layer, or a gold layer.

5. The pre-fabricated sensor assembly of claim 3, wherein:
    each flexible sensing line of the plurality of flexible sensing lines includes a passivation layer that overlies the flexible base layer, extending between the flexible base layer and the metal layer.

6. The pre-fabricated sensor assembly of claim 2, wherein:
    the first direction and the second direction are substantially orthogonal; and
    a width of the first section of each flexible sensing line is less than a width of the second section of each flexible sensing line.

7. The pre-fabricated sensor assembly of claim 6, wherein:
    the capacitive touch sensor comprises an adhesive layer including a first surface coupled to the first section of each flexible sensing line and including a second surface;
    the capacitive touch sensor comprises a shield layer that is coupled to the second surface of the adhesive layer; and
    the shield layer extends over at least the first section of each flexible sensing line to provide a ground for electrical fields at the first section of each flexible sensing line.

8. The pre-fabricated sensor assembly of claim 7, wherein:
    the first section of each flexible sensing line of the plurality of flexible sensing lines extends beyond an outer perimeter of the shield layer.

9. The pre-fabricated sensor assembly of any one of claims 6, wherein:
    the second section of each flexible sensing line of the plurality of flexible sensing lines has a length that is different than a length of the second section of each other flexible sensing line of the plurality of flexible sensing lines.

10. The pre-fabricated sensor assembly of claim 1, wherein:
    each sensing line of the plurality of flexible sensing lines includes a conductive thread; and
    at least a portion of each conductive thread is attached to a textile-based substrate.

11. The pre-fabricated sensor assembly of claim 10, wherein:
    each conductive thread includes a first section that extends in a first direction and a second section that extends in a second direction;
    the first direction is substantially orthogonal to the second direction;
    the first section of each conductive thread is attached to the textile-based substrate; and
    the second section of each conductive thread is loose from the textile-based substrate and extends beyond an outer perimeter of the textile-based substrate.

12. The pre-fabricated sensor assembly of claim 11, wherein:
    the first section is woven with the textile-based substrate; and
    the second section is embroidered to the object substrate of the interactive object.

13. The pre-fabricated sensor assembly of claim 1, wherein:
    the capacitive touch sensor includes a first capacitive touch portion comprising the plurality of flexible sensing lines;
    the capacitive touch sensor includes a second capacitive touch portion comprising a second subset of the plurality of flexible sensing lines, each flexible sensing of the second plurality including a first section that is elongated in the first direction and including a second section;
    and
    one or more sensing circuits physically coupled to the first plurality of flexible sensing lines and the second plurality of flexible sensing lines;
    wherein the second section of each flexible sensing line of the first plurality of flexible sensing lines forms a touch-sensitive area of the first capacitive touch portion;
    wherein the second section of each flexible sensing line of the second plurality of flexible sensing lines forms a touch-sensitive area of the second capacitive touch portion.

14. The interactive object of claim 13, wherein:
    the one or more shield layers overlie the first section of each flexible sensing line of the second plurality of flexible sensing lines.

15. The interactive object of claim 14, wherein:
    the second section of each flexible sensing element of the second plurality of flexible sensing lines is elongated in the second direction.

16. The interactive object of claim 14, wherein:
    the second section of each flexible sensing line of the second plurality of flexible sensing lines is elongated in the first direction.

17. A method of manufacturing an interactive object, comprising:
    providing a pre-fabricated sensor assembly comprising one or more flexible retaining layers, a capacitive touch sensor, a first electronics module, and a communication interface having a first end portion coupled to the first electronics module and a second end portion coupled to a receptacle configured to removably connect a second electronics module to the pre-fabricated sensor assembly, wherein the pre-fabricated sensor assembly comprises a plurality of flexible sensing lines coupled to the first electronics module, each flexible sensing line including a first section that extends in a first direction at a first portion of the pre-fabricated sensor assembly and a second section that extends in a second direction at a second portion of the pre-fabricated sensor assembly, the pre-fabricated sensor assembly including an adhesive layer having a first surface coupled to the first section of each flexible sensing line and a second surface coupled to a shield layer such that the shield layer extends over at least the first section of each flexible sensing line to provide a ground for electrical fields at the first section of each flexible sensing line;
    providing an at least partially fabricated object comprising an object substrate; and attaching the pre-fabricated sensor assembly to the object substrate after providing the at least partially fabricated object;

wherein the communication interface extends from within a housing formed by the one or more flexible retaining layers to outside of the one or more flexible retaining layers; and wherein the receptacle extends at least partially outside of the one or more flexible retaining layers to enable removable connection of the second electronics module.

18. The method of claim 17, wherein attaching the pre-fabricated sensor assembly to the object substrate comprises heat pressing the one or more retaining layers to the object substrate of the interactive object.

19. The method of claim 18, wherein attaching the pre-fabricated sensor assembly to the object substrate comprises:

attaching the receptacle by sewing the receptacle to the object substrate of the interactive object.

20. An interactive object comprising:

an object substrate; and a pre-fabricated sensor assembly at least partially coupled to the object substrate, the pre-fabricated sensor assembly comprising:

a plurality of flexible sensing lines that each include a first section that extends in a first direction at a first portion of the pre-fabricated sensor assembly and a second section that extends in a second direction at a second portion of the pre-fabricated sensor assembly, the pre-fabricated sensor assembly including an adhesive layer having a first surface coupled to the first section of each flexible sensing line and a second surface coupled to a shield layer such that the shield layer extends over at least the first section of each flexible sensing line to provide a ground for electrical fields at the first section of each flexible sensing line;

sensing circuitry in electrical communication with the plurality of flexible sensing lines;

a communication interface comprising a first end portion coupled to the sensing circuitry and comprising a second end portion;

a receptacle coupled to the second end portion of the communication interface and configured to removably connect an electronics module to the pre-fabricated sensor assembly; and one or more flexible retaining layers physically coupled to the object subject and defining a housing for a first portion of the pre-fabricated sensor assembly, the first portion of the pre-fabricated sensor assembly including at least a portion of each of the plurality of flexible sensing lines;

wherein the communication interface extends from within the housing of the one or more flexible retaining layers to outside of the one or more flexible retaining layers; and wherein the receptacle extends at least partially outside of the one or more flexible retaining layers to enable removable connection of the electronics module.

* * * * *